United States Patent
Crane et al.

(10) Patent No.: US 11,509,199 B2
(45) Date of Patent: Nov. 22, 2022

(54) SYSTEMS AND PROCESSES FOR ALIGNING PERMANENT MAGNET MOTORS IN AN ELECTRIC SUBMERSIBLE PUMP

(71) Applicant: EXTRACT MANAGEMENT COMPANY, LLC, Tulsa, OK (US)

(72) Inventors: Mitchell Lee Crane, Tulsa, OK (US); Jose Mauricio Oviedo Gualdron, Tulsa, OK (US)

(73) Assignee: EXTRACT MANAGEMENT COMPANY, LLC, Tulsa, OK (US)

( * ) Notice: Subject to any disclaimer, the term of this patent is extended or adjusted under 35 U.S.C. 154(b) by 0 days.

(21) Appl. No.: 17/222,817

(22) Filed: Apr. 5, 2021

(65) Prior Publication Data

US 2021/0296970 A1    Sep. 23, 2021

Related U.S. Application Data

(63) Continuation of application No. PCT/US2020/052256, filed on Sep. 23, 2020.
(Continued)

(51) Int. Cl.
| | |
|---|---|
| *H02K 1/14* | (2006.01) |
| *H02K 1/274* | (2022.01) |
| *H02K 5/132* | (2006.01) |
| *H02K 15/00* | (2006.01) |
| *H02K 16/00* | (2006.01) |
| *E21B 43/12* | (2006.01) |

(Continued)

(52) U.S. Cl.
CPC .......... *H02K 15/00* (2013.01); *E21B 43/128* (2013.01); *H02K 1/146* (2013.01); *H02K 1/274* (2013.01); *H02K 1/278* (2013.01); *H02K 5/132* (2013.01); *H02K 16/00* (2013.01); *H02K 21/16* (2013.01); *F04B 17/03* (2013.01); *F04D 13/086* (2013.01); *H02K 2213/12* (2013.01)

(58) Field of Classification Search
CPC .......... H02K 5/12; H02K 5/124; H02K 5/128; H02K 5/1282; H02K 5/1285; H02K 5/132; H02K 2213/12; H02K 7/003; E21B 43/128; E21B 43/13; F04D 13/086; F04D 17/03
See application file for complete search history.

(56) References Cited

U.S. PATENT DOCUMENTS 4,500,226 A * 2/1985 Romand-Monnier ...................... H02K 5/132 403/13
4,910,861 A * 3/1990 Dohogne ............... H02K 1/278 264/272.2

(Continued)

FOREIGN PATENT DOCUMENTS

| CN | 201374627 Y | 12/2009 | |
|---|---|---|---|
| WO | WO-2010124595 A1 * | 11/2010 | ............. H02K 5/132 |

(Continued)

OTHER PUBLICATIONS

Int'l Search Report & Written Opinion (PCT/US2020/052256), dated Mar. 19, 2021.

*Primary Examiner* — Eric Johnson
(74) *Attorney, Agent, or Firm* — Hunton Andrews Kurth LLP

(57) ABSTRACT

The present invention relates to electric submersible pumps that have two or more permanent magnet motors and more specifically to such systems wherein permanent magnet motors are aligned using phase and pole alignment marks.

21 Claims, 24 Drawing Sheets

Related U.S. Application Data

(60) Provisional application No. 62/903,979, filed on Sep. 23, 2019.

(51) Int. Cl.
*H02K 1/278* (2022.01)
*H02K 21/16* (2006.01)
*F04B 17/03* (2006.01)
*F04D 13/08* (2006.01)

(56) References Cited

U.S. PATENT DOCUMENTS

| | | | |
|---|---|---|---|
| 5,193,614 A * | 3/1993 | Cox | E21B 17/023 166/105 |
| 5,588,818 A * | 12/1996 | Houmand | E21B 4/02 403/356 |
| 6,047,060 A | 4/2000 | Nagate et al. | |
| 6,388,353 B1 * | 5/2002 | Liu | F04B 13/00 310/114 |
| 7,971,650 B2 | 7/2011 | Yuratich et al. | |
| 2002/0079763 A1 * | 6/2002 | Fleshman | H02K 5/132 310/87 |
| 2008/0284268 A1 * | 11/2008 | Yuratich | H02K 1/278 310/156.09 |
| 2009/0230825 A1 * | 9/2009 | Braun | F16D 3/04 310/75 D |
| 2019/0264707 A1 | 8/2019 | Crane et al. | |

FOREIGN PATENT DOCUMENTS

| | | |
|---|---|---|
| WO | 2015096547 A1 | 7/2015 |
| WO | 2016003309 A1 | 1/2016 |
| WO | 2018112399 A1 | 6/2018 |

\* cited by examiner

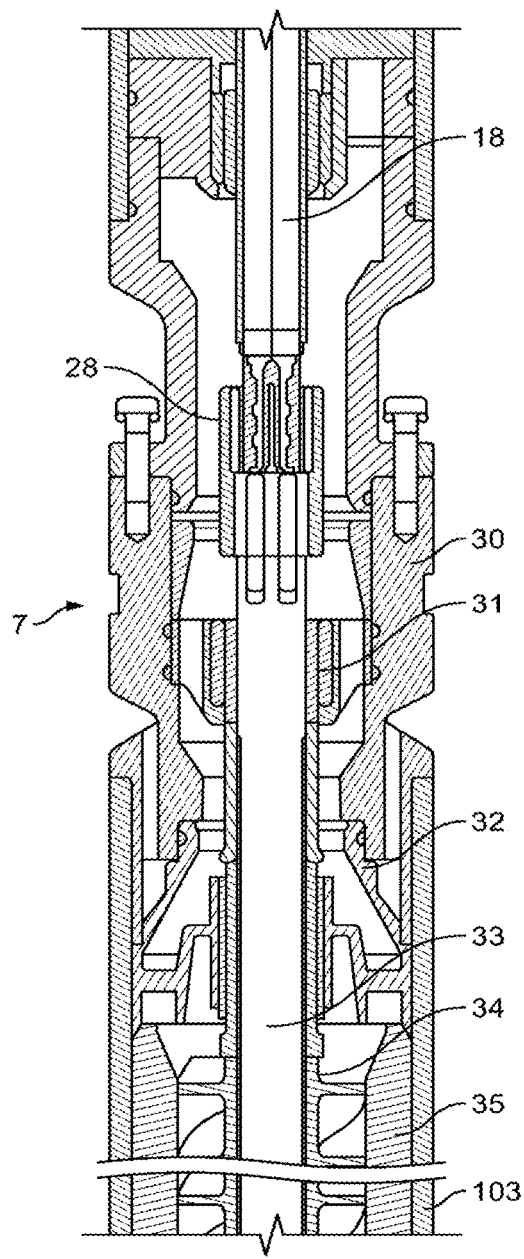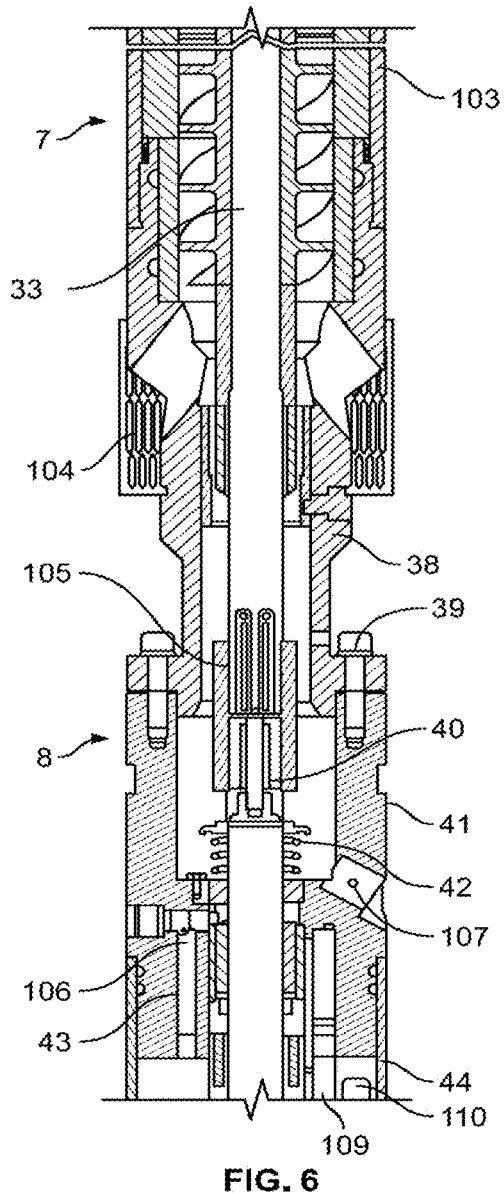
FIG. 5
FIG. 6

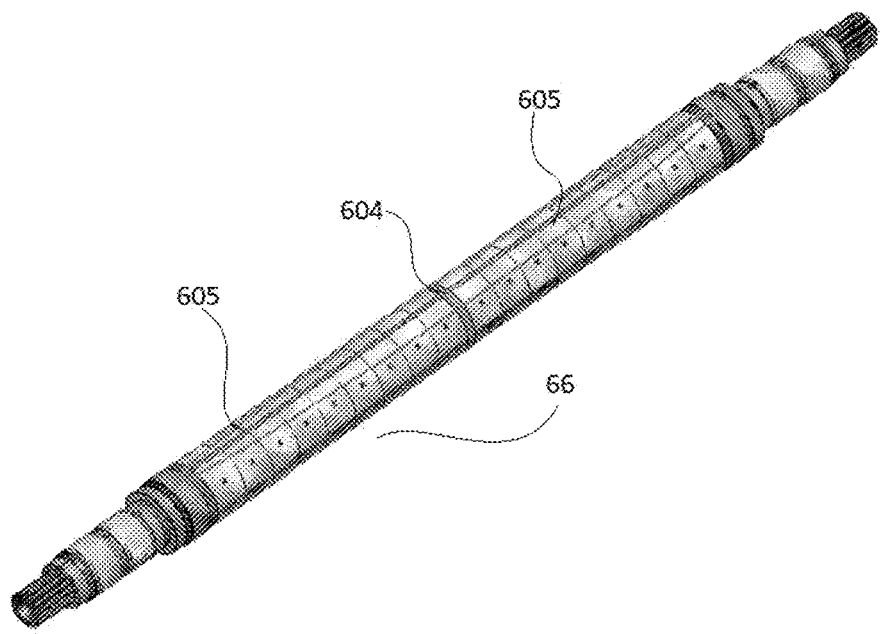
FIG. 29
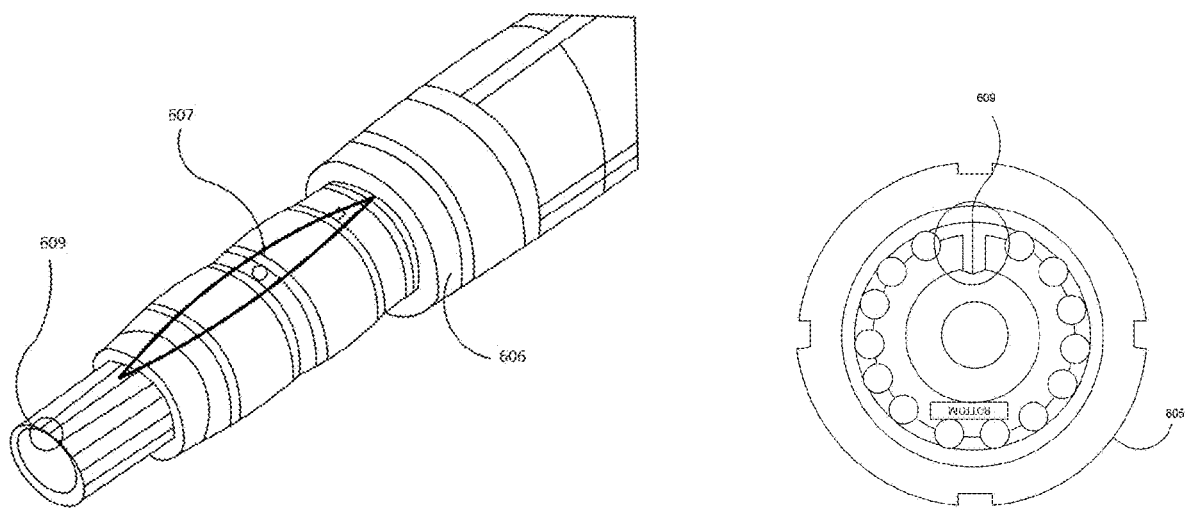
FIG. 30A
FIG. 30B

SYSTEMS AND PROCESSES FOR ALIGNING PERMANENT MAGNET MOTORS IN AN ELECTRIC SUBMERSIBLE PUMP

CROSS REFERENCE TO RELATED APPLICATIONS

This U.S. application is a continuation of PCT Application Number PCT/US2020/052256 filed on Sep. 23, 2020 which PCT application claims priority to U.S. Provisional Application No. 62/903,979 filed Sep. 23, 2019, the disclosures of which are incorporated herein by reference.

FIELD OF THE INVENTION

The present inventions are directed to electric submersible pump assemblies for wells and in particular to high-speed components related to electric submersible pumps.

BACKGROUND AND SUMMARY OF THE INVENTION

Permanent magnet motors may be employed in electric submersible pumps as described in, for example, Ser. No. 16/232,811 filed Feb. 22, 2019 and published as US 2019/0264703 on Aug. 29, 2019 which publication is incorporated herein by reference in its entirety. Prior art systems could not employ two or more permanent magnet synchronous motors because it was not known how or if they could be aligned properly. Thus, if two or more permanent magnet synchronous motors are to be employed in an electric submersible pump in, for example, in series, then what is needed is an effective way to ensure that the motors are aligned. Advantageously, the present invention pertains to cost-effectively aligning such motors.

In one embodiment, the present invention pertains to a process for connecting two or more permanent magnet motors in series. The method comprises aligning the phases of the stators and aligning the poles on the rotors. A phase identifying mark is made on each stator while a pole identifying mark is made on each rotor.

In another embodiment, the present invention pertains to an electrical submersible pump comprising a first permanent magnet motor comprising a first rotor with a first pole identifying mark and a first stator with a first phase identifying mark. A second permanent magnet motor comprises a second rotor with a second pole identifying mark and a second stator with a second phase identifying mark. The phases of the first and second stators are aligned and wherein the poles of the first and second rotor are aligned.

Electric Submersible Pumps (ESP) are widely used in the production of fluid from oil and gas wells. Traditional ESPs have a centrifugal pump coupled to an electric motor. The motor is typically protected from wellbore fluid ingress by a seal (also referred to as protector or equalizer). The seal section is located between the motor and the pump which serves to reduce any pressure difference between the wellbore fluid exterior of the motor and the lubricant on the interior of the motor.

The rotary pump in many ESPs includes a rotating shaft, impeller, and stationary diffuser. The impellers are coupled to the shaft and create lift as they rotate, driving wellbore fluid up the well. A standard induction type motor may include a single continuously wound stator, a single shaft, one or multiple induction type rotors mounted on the shaft, and rotor bearings to the centralize the shaft.

Various disclosed embodiments of the invention may have one or multiple advantages over standard ESP units. Some disclosed embodiments utilize a wider range of operating speeds, utilize an active cooling system to reduce motor temperature rise, reduce the amount of time required to assemble or install a unit, and/or improve the power efficiency of the ESP system.

Disclosed embodiments may also reduce the inventory required through the use of standardized components, reduce capital requirements, reduce personnel requirements, and/or decrease rig exposure to an open well bore during installation, thereby increasing safety.

Some of the disclosed embodiments incorporate high-speed downhole components including pumps, seals, gas separators, intakes, motors and/or downhole sensors.

Some embodiments comprise a permanent magnet synchronous motor with a control system for speed regulation. Some embodiments may additionally or alternative comprise a high-speed pump, seal section and/or gas separator connected and aligned along a common axis. In some embodiments, the motor may be of modular construction and/or have an active cooling system that increases heat removal from the system via lubricant circulation through a heat exchange module. In certain embodiments, a downhole sensor may be utilized to control the operation of the ESP in substantially real time.

BRIEF DESCRIPTION OF THE FIGURES

FIG. 5 depicts a schematic of a lower portion of an exemplary pump and upper portion of an exemplary gas separation model.

FIG. 6 depicts a schematic of an lower portion of an exemplary gas separation module and upper portion of a seal section.

FIG. 29 shows Rotor Shown without retention Sleeve with dividing strip between magnetic poles.

FIG. 30A shows Pole division aligned with keyways and FIG. 30B shows Pole Position notch on end of shaft.

DETAILED DESCRIPTION OF THE INVENTION

In the following description, certain details are set forth such as specific quantities, sizes, arrangements, configurations, components, etc., so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

For the purposes of clarifying the various embodiments of the disclosed inventions, the systems and assemblies described below are presented in the context of an exemplary electric submersible pump. It will be apparent to those of ordinary skill that the disclosed system may be utilized with other equipment, components, and applications.

Exemplary Electric Submersible Pump Embodiments

Figure 1:
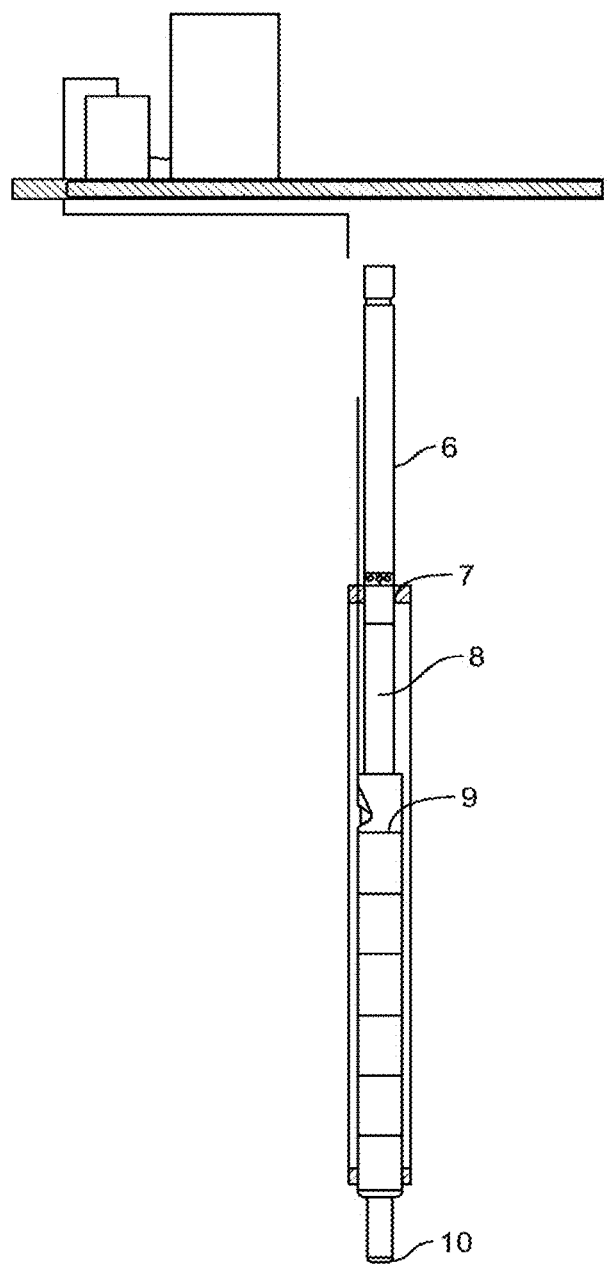
FIG. 1 depicts a schematic of an exemplary embodiment of a disclosed system.

In a non-limited exemplary embodiment, the disclosed inventions relate to an electric submersible pump (EPS) assembly. As shown in FIG. 1, the exemplary ESP comprises at least one centrifugal pump module (6), a gas separator (7), a seal section (8), an electric motor (9) with an active cooling system, and a downhole sensor unit (10). In operation, a motor generates torque, which is communicated through a motor shaft into a seal section shaft. The seal section shaft transmits torque up to the gas separator shaft, which transmits torque to the pump module. The pump module utilizes the motor generated torque to lift wellbore fluid up a well bore.

Figure 2:
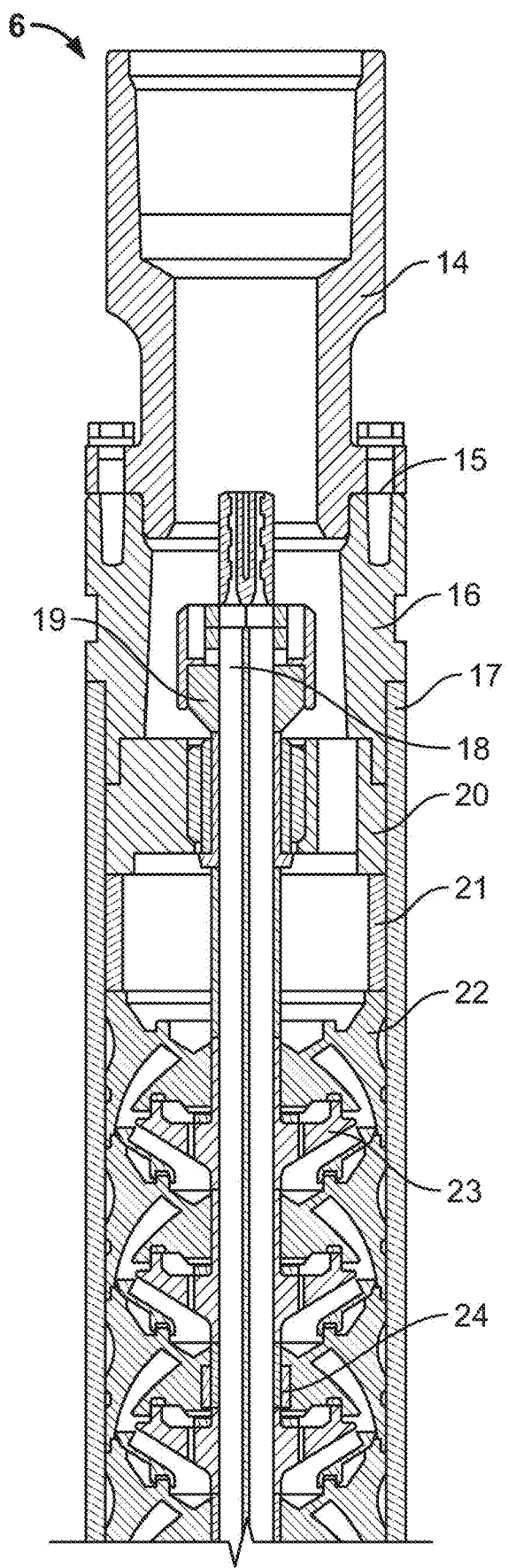
FIG. 2 depicts a schematic of an upper portion of an exemplary pump.

As shown in FIG. 2, a pump module (6) may have a discharge head (14). The discharge head (14) may be integral to the pump module (6) or be attached by any of a variety of suitable techniques as known in the art. The discharge head (14) may be connected via a flange to the pump head (16) using a flange or flangeless connection. In some embodiments, the discharge head (14) will be connected to the pump head (16) using corrosion resistant fasteners (15) such as, for example, screws. A pump shaft (18) may use a split ring to lock into an axially adjustable assembly (19). The pump shaft (18) may include a keyway including, for example, dual keyways, that attach the impellers (23) and bearing sleeves (24) to the shaft. In many embodiments, the impellers (23) and/or bearing sleeves (24) are rotationally fixed to the shaft (18). It will be understood that the term impeller, as used herein, may refer to any rotating component that is used to move a fluid.

A diffuser or, in some embodiments, a stack of diffusers (22) with bearing bushings, and impellers (23) may be placed inside the pump housing (17). A compression tube (21), a radial bearing support (20) and/or a pump head (16) may also be secured at least partially within the pump housing (17). In some embodiments, the pump head (16) may contain a high speed, self-aligning radial bearing system. In some embodiments, a high speed, self-aligning radial bearing system may be separate from the pump head or integral to the pump head.

Figure 3:
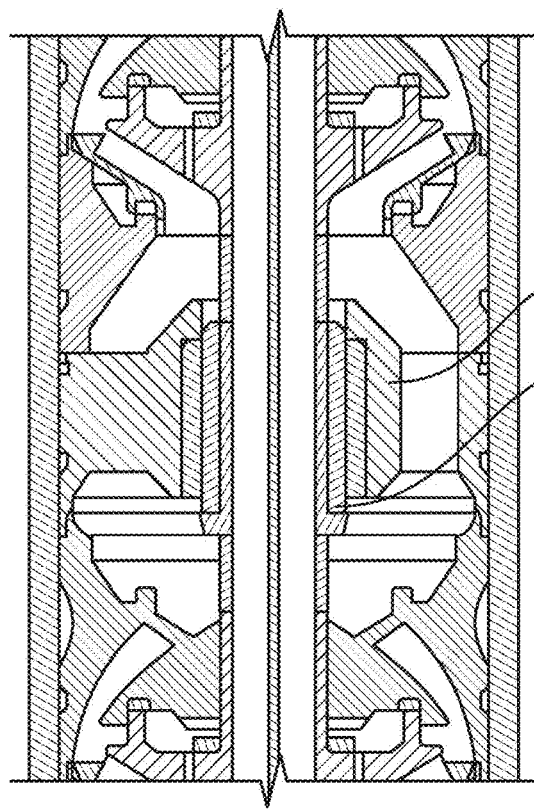
FIG. 3 depicts a schematic of a middle portion of an exemplary pump.

As shown in FIG. 3, a pump module (6) has at least one radial bearing support (25). In preferred embodiments, radial bearing support (25) comprises a radial bearing system comprising a bushing housed in a bearing support and a sleeve (25A) mounted on a shaft. In preferred embodiments, the radial bearing system comprises a high-speed, self-aligning (HSSA) bearing.

Figure 4:
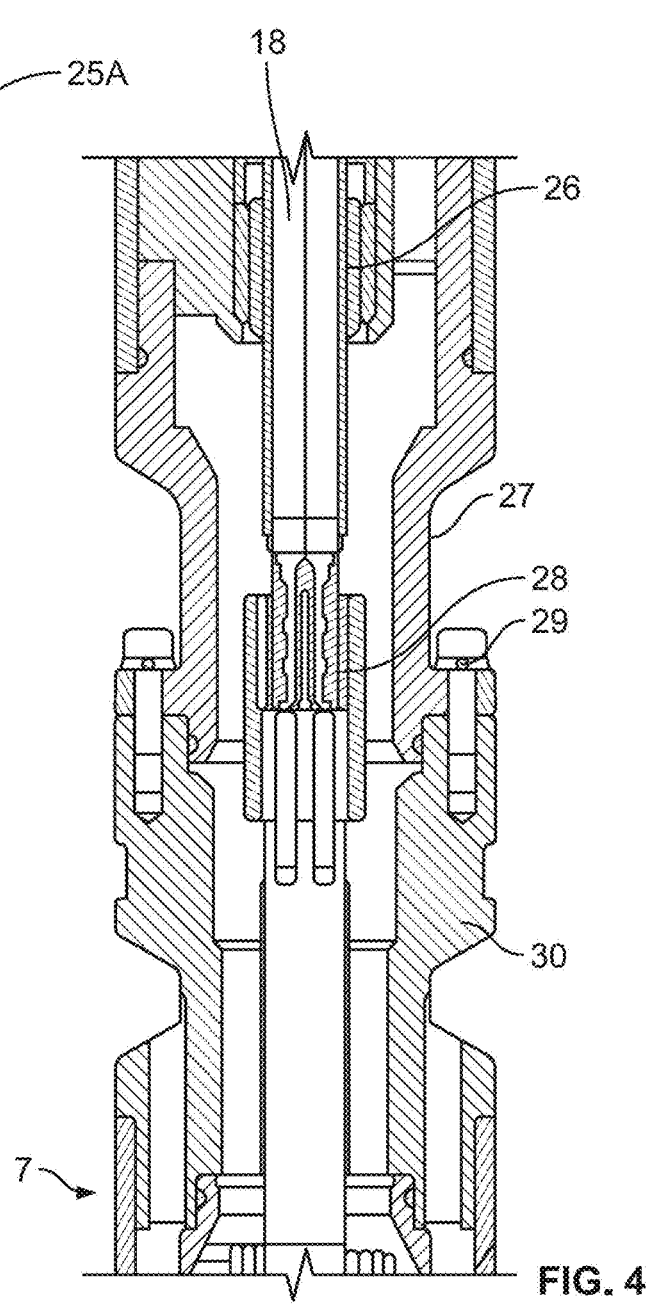
FIG. 4 depicts a schematic of a lower portion of an exemplary pump and upper portion of a gas separation module.

As shown in FIG. 4, a pump shaft (18) may have splines which connect to a coupling (28). In some embodiment, the splines described here, as well as throughout the application, may be involute splines, SAE6 splines, or other variations which allow a shaft to connect to a coupling. The coupling (28) may transmit torque from the shaft of a gas separator module (7) to the pump shaft. The bottom flange (27) of the pump module (7) may be secured to the top flange (30) of a gas separator module (7) using fasteners (29) which may include, for example, high strength corrosion resistant screws. In many embodiments, impellers (23) and bearing sleeves (24) form a rigid connection with the pump shaft (18). The bottom flange (27) may contain a radial bearing system, preferably comprising a HSSA bearing used to provide radial support to the pump shaft (18). It will be appreciated that the terms bottom flange and base may be used interchangeably throughout the specification. It will also be appreciated that the terms top flange and head may be used interchangeably throughout the specification.

As shown in FIG. 5, a gas separator module (7) may comprise a top flange (30) with a HSSA bearing (31) and phase crossover (32). Phase crossover (32) directs the gas phase of the production fluid to the wellbore annulus and the liquid phase into the pump. A spiral inducer (34) may be locked to the gas separator shaft (33) via a keyway or dual keyways. A gas separator housing (103) may be fitted with sleeves (35), to protect the inner surface of the gas separator housing from abrasive wear and corrosion. In some embodiments, these sleeves (35) may comprise a metal ceramic such as, for example, tungsten carbide, silicon carbide, or zirconium carbide, and/or other materials that provide wear resistance, abrasion resistance, corrosion resistance, or other desirable properties.

As shown in FIG. 6, the bottom flange (38) of the gas separator module (7) may comprise a HSSA radial bearing and have at least one port for the inflow of wellbore fluid.

Wellbore fluid may refer to single and/or multi-phase wellbore or formation fluid. In some embodiments, the bottom flange (38) of the gas separator module may be fitted with a screen (104) for removing debris from the wellbore fluid. Torque may be transmitted to the gas separator shaft (33) from the seal section (8) through a splined coupling (105). The bottom flange (38) of the gas separator (7) may be connected to a flange (41) of the seal section (8) via high strength corrosion resistant screws (39).

The seal section (8) may be a multi-chamber assembly which serves at least one of four main functions: (1) transmitting torque from the motor module to the pump module; (2) absorbing thrust from the pump module; (3) protecting an internal chamber of the motor module from wellbore fluid; and/or (4) reducing a pressure differential between the interior and exterior of the motor. It will be appreciated that the terms seal section, equalizer, and/or protector may be used synonymously within the industry to refer to a seal section In some exemplary embodiments, a seal section (8) may have a top flange or head (41) with a HSSA bearing, a dual key shaft and/or seal section shaft (40), and a mechanical seal (42). In some embodiments, the seal section shaft (40) comprises splines on both ends. In some embodiments, the mechanical seal (42) is a high-speed mechanical seal configured to protect the seal section (8) from wellbore fluid ingress around the shaft (40). In preferred embodiments, the seal section shaft (40) is fitted with a HSSA bearing sleeve (43), which interact with a HSSA bearing bushing. Top flange (41) of the seal section may have a vent port (106) for removal of air or other gases when the internal chamber of the electric motor is filled with lubricant. In some embodiments, the lubricant serves as a coolant and/or is a dielectric or substantially dielectric fluid. Top flange (41) may also have a tangential port (107) for removal of sediment, particulate, or other solids, around the mechanical seal (42). The body of the top flange may have a port with a tube (109) inserted in it which facilitates the transmission of an external hydraulic pressure from the wellbore fluid to the filling fluid and/or lubricant of the seal section and/or electric motor. In some embodiments, the tube (109) follows a labyrinth scheme. In some embodiments, the labyrinth transmission of hydrostatic pressure between the external wellbore fluid and internal lubricant may be carried using tube (109) and tube (110). The seal section head (41) may be connected to the upper seal section housing (44).

Figure 7:
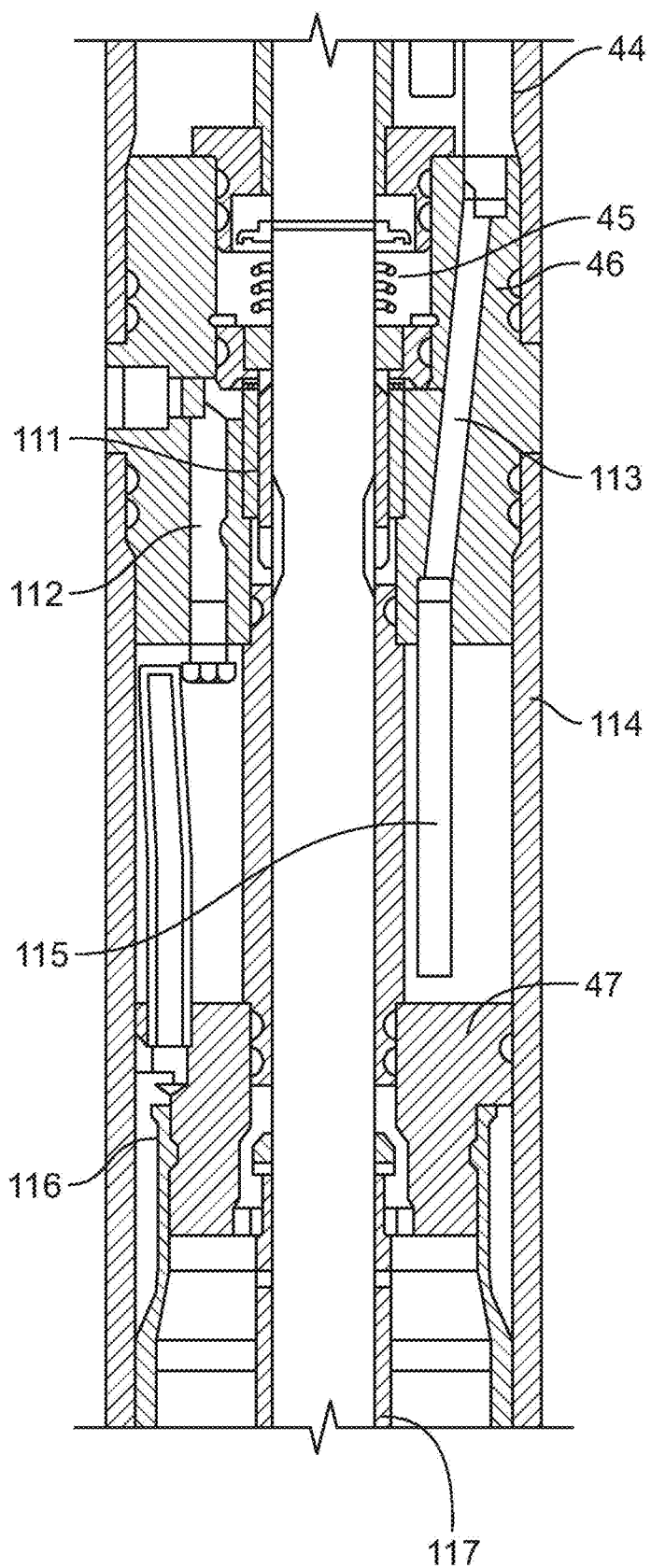
FIG. 7 depicts a schematic of a portion of an exemplary seal section.

As shown in FIG. 7, the bottom of the upper seal section housing (44) may be connected to the upper seal section body (46) where a second mechanical seal (45) may be installed. In such embodiments, the second mechanical seal (45) separates the labyrinth chamber from a bag chamber, additional labyrinth chambers, or combinations thereof. The seal section body may also contain a HSSA bearing, (111), a vent port (112) and/or a connecting channel (113) between an upper labyrinth chamber and a central chamber of the bag chamber section and/or additional labyrinth chambers. The specific configuration of labyrinth chamber and/or bag chamber may depend on the conditions of the well, other components of the ESP, and/or other factors.

The upper seal section body (46) may be connected to the central seal section housing (114). The bottom portion of the upper seal section body (46) may be fitted with a tube (115) of the second labyrinth to transmit hydrodynamic and/or hydrostatic pressure from the top chamber to the central chamber. The central seal section housing (114) may be fitted with an upper bag support (47) and the bag may be secured with a clamp (116) to the upper bag support (47). In some embodiments, the upper bag support (47) may be connected to a lower bag support (118) via a support tube (117). Support tube (117) facilitates a rigid connection between the upper bag support (47) and lower bag support (118). In some embodiments a single bag may be used. In other embodiments a plurality of bags may be arranged in succession using a similar mounting technique.

Figure 8:
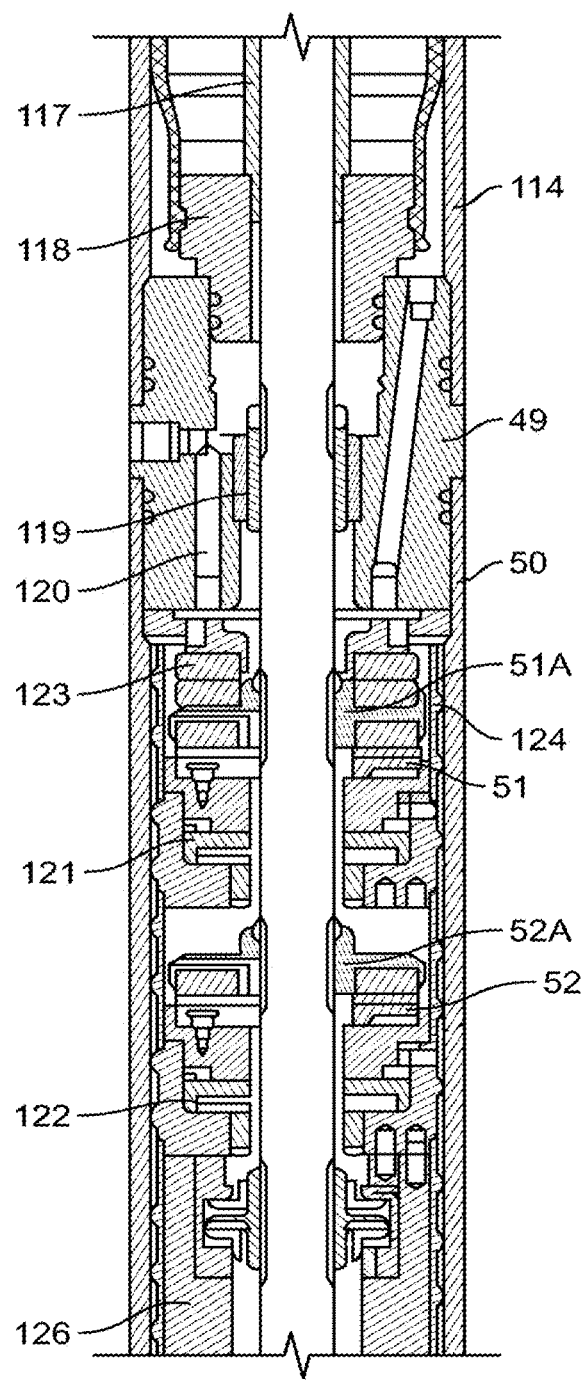
FIG. 8 depicts a schematic of a portion of an exemplary thrust chamber in the lower portion of the seal section.

As shown in FIG. 8, a lower bag support (118) may be connected to a lower seal body (49) between the central seal section housing (114) and the thrust chamber housing (50). The lower seal section body (49) may be fitted with a HSSA bearing (119) and/or a vent port (120). The lower seal section body (49) may contain a high-speed mechanical seal and a HSSA bearing and may be threaded into the thrust chamber housing (50). In some embodiments, the thrust chamber housing (50) contains single, dual, or multiple thrust bearings (51) and (52).

In some embodiments, each of the thrust bearings (51 and 52) may be fitted with a spring damper (121 and 122). The spring dampers may facilitate a more even or substantially uniform distribution of the operational thrust load between the thrust bearings (51 and 52). In some embodiments, the spring dampers may comprise a Belleville washer stack. In some embodiments, the washer stack is run in a parallel configuration to promote even thrust load transfer across the two thrust bearings.

The top thrust runner (51A) may be dual-sided and engage against a static face (123) to absorb potential up-thrust. Up-thrust may be encountered during start-up. A down-thrust face on the top thrust runner (51A) may engage against the upper thrust bearing assembly (51) if down-thrust is encountered. In some embodiments, a single sided runner (52A) may engage against a lower thrust bearing assembly (52) in the event of down thrust.

A thrust chamber heat exchanger may comprise an inner wall (124). In some embodiments, the exterior of this inner wall may be spiraled or otherwise comprise a helical or other tortuous pathway used to move motor oil or other lubricant from the top of the thrust chamber to the bottom of the thrust chamber in close proximity to the thrust chamber housing 50. The lubricant pathway between the inner wall of the thrust chamber heat exchanger and the thrust chamber housing (50) may be helical or otherwise tortuous path in order to increase the residence time of the lubricant in the heat exchanger pathway, thereby increasing the amount of heat dissipated through the thrust chamber housing (50) to the wellbore fluid. Once the circulated lubricant reaches the bottom of the thrust chamber it may passes through a filter (126) before being circulated through the thrust chamber again.

In some embodiments, the lubricant has a high dielectric strength and/or a high viscosity. In some embodiments, the lubricant has a dielectric of greater than 20 KV, or greater than 25 KV, or greater than 30 KV, or greater than 35 KV. In some embodiments, the lubricant has a dielectric of at most 20 KV, or at most 25 KV, or at most 30 KV, or at most 35 KV.

In some embodiments, the lubricant has a viscosity at 40° C. of at least 60 CST, or at least 70 CST, or at least 80 CST, or at least 100 CST, or at least 120 CST, or at least 140 CST. In some embodiments, the lubricant has a viscosity at 40° C. of at most 70 CST, or at most 80 CST, or at most 100 CST, or at most 120 CST, or at most 140 CST, or at most 160 CST.

In some embodiments, the lubricant has a viscosity at 100° C. of at least 5 CST, or at least 7 CST, or at least 10 CST, or at least 12 CST, or at least 14 CST, or at least 16 CST. In some embodiments, the lubricant has a viscosity at 100° C. of at most 7 CST, or at most 10 CST, or at most 12 CST, or at most 14 CST, or at most 16 CST, or at most 18 CST.

Figure 9:
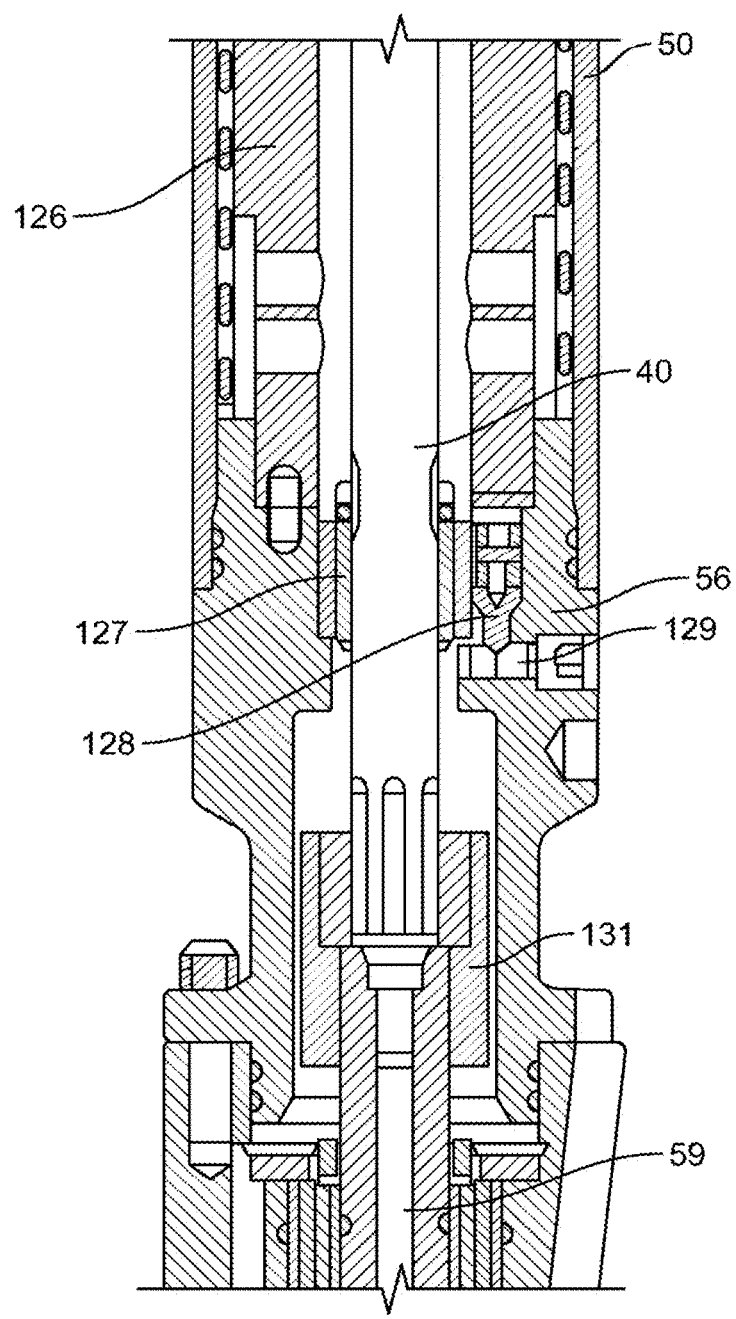
FIG. 9 depicts a schematic of a portion of an exemplary thrust chamber and motor head module.

As shown in FIG. 9, the lower part of the thrust chamber housing (50) may be designed with a threaded connection. This threaded connection may be used to connect the thrust chamber housing (50) to the seal section base (56) which may be fitted with a HSSA bearing (127) and/or a relief valve (128) for factory filling of the seal section with coolant, lubricant, dielectric fluid, or a fluid with more than one of these properties.

The seal section base (56) may be fitted with a screw (129) which actuates the valve (128) and allows for the flow of the lubricant fluid into the free cavity between the bottom flange of the seal section and the top flange of the motor module. Bottom splines on the seal section shaft (40) may be mated to a coupling (131), which may be used to transmit torque from the motor head module shaft (59) to the seal section shaft (40).

Figure 10A:
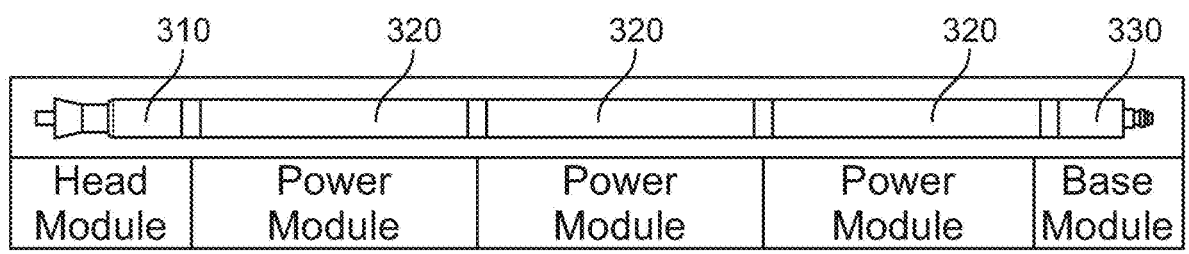
FIG. 10A depicts an exemplary embodiment of a disclosed motor.

As shown in FIG. 10A, in some exemplary embodiments, the motor module (9) may be a permanent magnet synchronous motor of modular construction. The combined motor module (9) may comprise, a head module (310), Power modules (320), and base module (330).

Figure 10B:
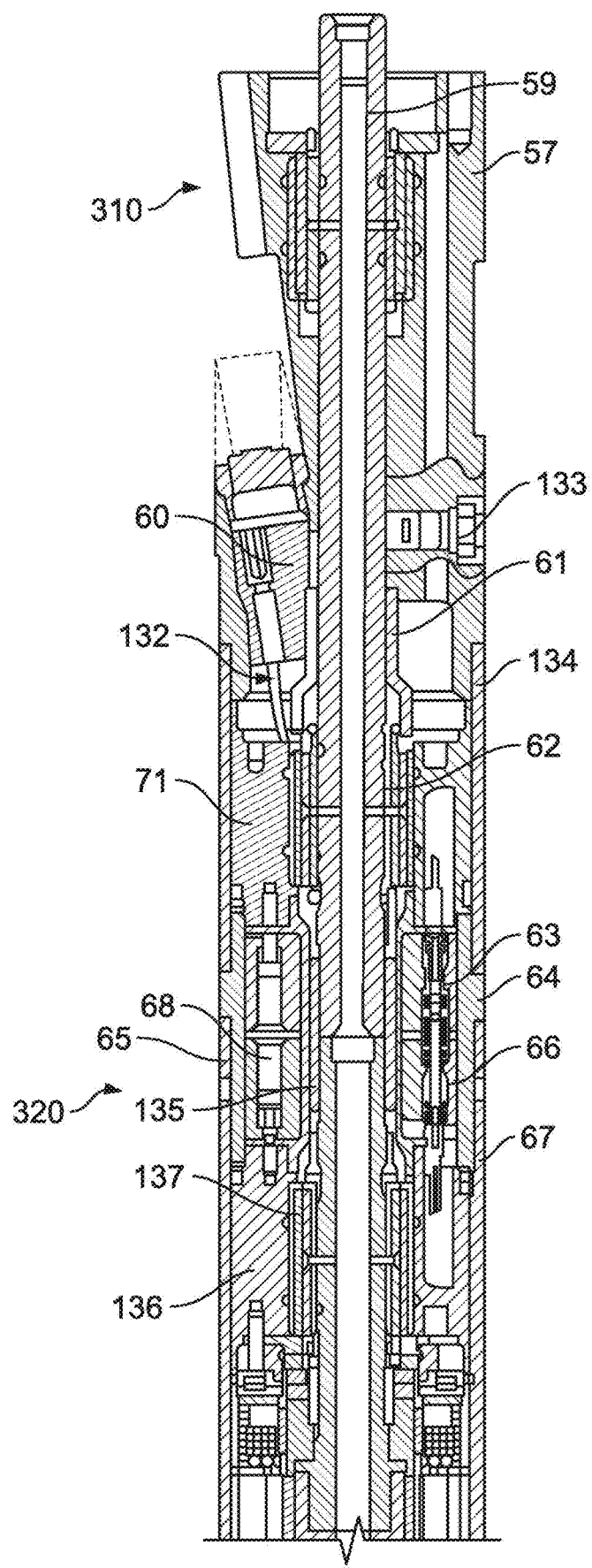
FIG. 10B depicts a schematic of a portion of an exemplary motor head module.

As shown in FIG. 10B, in some embodiments, the head module (310) comprises a HSSA bearing as well as a head (57), a hollow head module shaft (59) which may have splines, a head module housing (134), a terminal block (60), and/or a flangeless connection (64) that may be used to mate the head module to the top of a power module.

The terminal block (60) may hold three terminals that mate to the motor lead cable and seal the connection against the ingress of wellbore fluids. These terminals may be connected internally via lead wire (132) to the female terminals in the insulation block (68). The bottom part of the head (57) may be fitted with a protective insert (61) which may be used to protect the lead wire from the rotating head module shaft (59)

The head module (310) may also be also fitted with a filling valve (133) which may be used to fill the internal chamber of the electric motor and/or lower chamber of the seal section with lubricant when the unit is run in combination with a seal section (9).

The head module housing (134) may be threaded on to the head (57) and/or a bearing support (71). In some embodiments, the bearing support is integral to the head (57). A HSSA Bearing (62) may be installed in the head module housing and held in place by a retaining nut. In certain embodiments, the bearings support, whether integral to the head or a separate component, may also comprise mounting holes for any female terminals that connect to the male terminals on a power module.

The lower part of the head module housing (134) may have a flangeless connection (64). In an exemplary flangeless connection (64), the threads on either end may be in opposite directions from one another to enable a threaded connection to a power module (320) without an external upset along the exterior of the motor. For example, the flangeless connection (64) may make up to the head module housing (134) via right hand threads, while the opposite end may make up to the power module housing (136) which contains left-hand threads. It will be appreciated that right-hand threads turn in an opposing direction as compared to left-hand threads. This connection may then be secured by locking a retaining nut (65) against the housing of the power module. The connection may also be secured using a set screw or other similar retaining method. As the connection is made, special alignment tools may be used to ensure that the power terminals (63) and (68) and shaft coupling are mated properly. The lower splines of the head module shaft (59) may connect to a coupling (135) designed to transmit torque from the shaft of the rotor (66) in the power module to the head module shaft (59). A bearing support (136) may be located in the upper end of a power module (320) where an upper HSSA bearing bushing (137) may be located and/or where a power module rotor (66) may be positioned.

Figure 11:
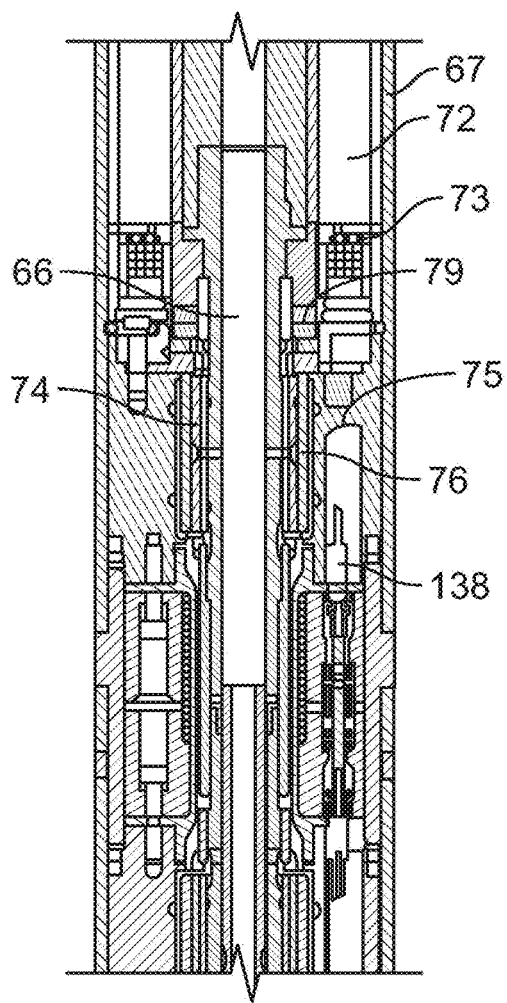
FIG. 11 depicts a schematic of a portion of an exemplary power module.

As shown in FIG. 11, a wound stator core (72) may be positioned within the power module housing (67). The winding coils may be located inside the stator core (72). A lower bearing support (75) may be positioned inside the power module housing (67) below the winding end coils (73). The lower bearing support (75) may be fitted with a HSSA Bearing bushing (76) and a corresponding HSSA Bearing sleeve (74). HSSA bearing sleeve (74) may be connected to a rotor (66).

In some embodiments, both the upper and lower end of the rotor (66) are associated with axial thrust pads (79) which allow the rotor (66) to self-align within the magnetic field of the wound stator core (72).

A lower bearing support (75) may have mounting slots for the lower terminals (138) from the wound stator core (72) above. In some embodiments, a lower portion of the power module housing (67) may utilize a flangeless connection system similar to or substantially the same as the flangeless connection previously mentioned.

Figure 12:
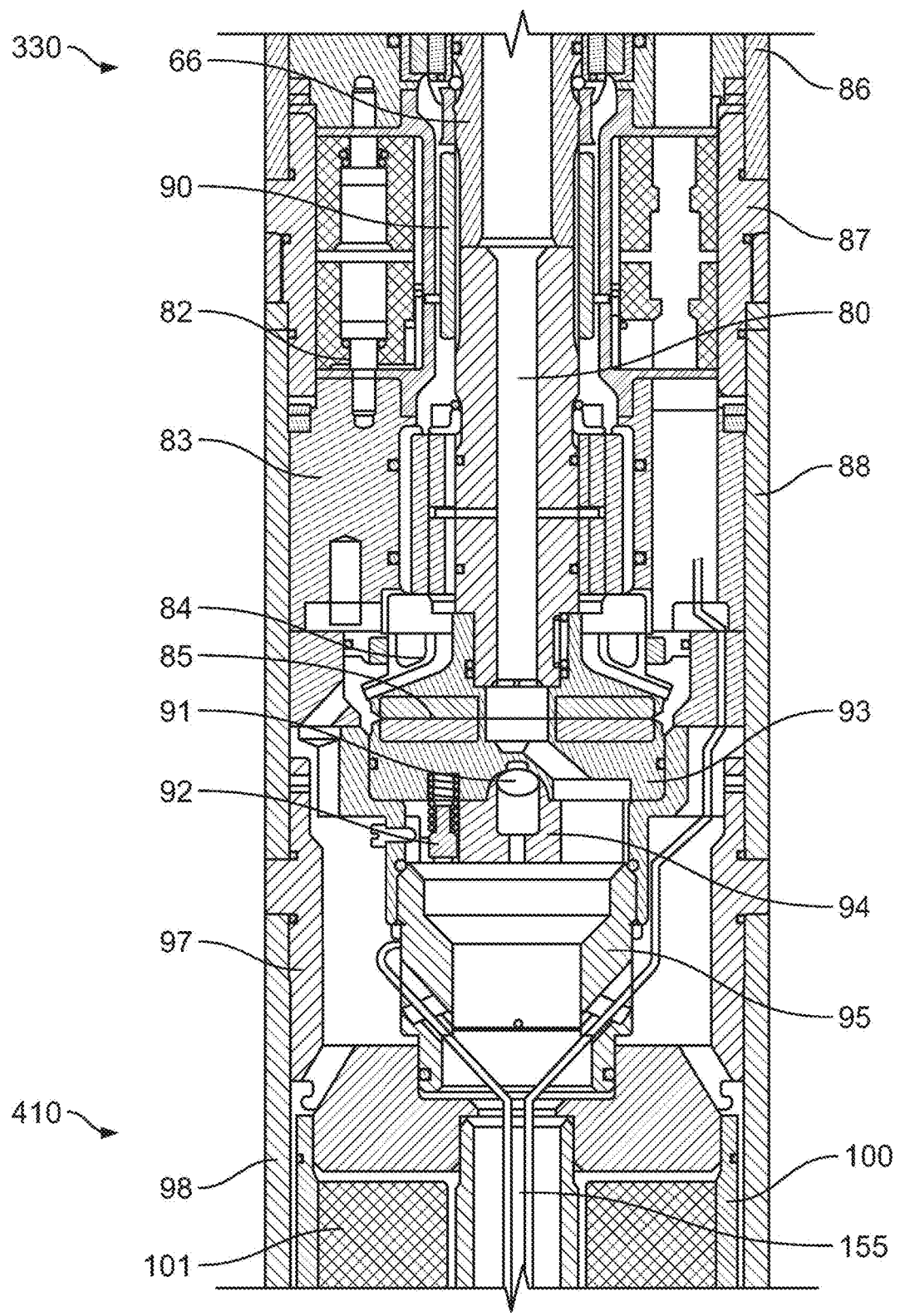
FIG. 12 depicts a schematic of portion of an exemplary base module.

As shown in FIG. 12, a motor base module (330) may comprise a base module housing (88), a hollow shaft (80) with a HSSA bearings sleeve, a bearing support (83) with a HSSA bearing bushing, an impeller (84) and/or an adjustable axial thrust pad (85). In some embodiments, the bearing support (83) of the base module (320) may contain mounting points for the male terminals (82) that connect to the female terminals of a lower power module. In some embodiments, terminals (82) may be connected with a copper bus to create a wye point that connects all three phases of the motor. A lower power module housing (86) may be mated to the base module housing (88) via a split ring (87) or flangeless connection system.

In some embodiments, the lower end of the rotor shaft (66) may be mated to a base module shaft (80) via a splined coupling (90).

In some embodiments, a centrifugal pump impeller (84) may be mounted on the base module shaft (80). The impeller (84) may be fitted with an abrasive-resistant runner which may be configured to contact a thrust bearing (85). The thrust bearing (85) may have swiveling support (91) with a spring insert (92), which facilitates more uniform contact of the friction surfaces of an axial bearing (93). The body of the axial bearing (93) may rest on a connecting coupling (94) and be fitted with an adjusting support (95) which may be used to adjust the axial clearance of the rotors throughout the motor system.

In some embodiments, the elements of the base module (320) may have holes which form a channel for a sensor wire and/or a thermocouple to be passed through. These wires may go through the central channel of a heat-exchanger module to a flange for a downhole sensor (10).

Connecting coupling body (97) may include an upper and/or lower thread which may be used to secure the base module housing (88) to a central heat exchange module (410) exterior housing (98). Connecting coupling (97) may have tangential channels which may be used to direct the flow of lubricant into a pathway between the exterior housing (98) and the interior housing (100) of the central heat exchange module (410). In some embodiments, the flow in this pathway is in a spiral or helical motion due to the outer wall of the interior housing (100) having a guide vane connected in a helical path to direct the flow of lubricant. This helical pathway may be used to increase the residency time of the lubricant and increase the amount of heat transferred from the lubricant to the wellbore fluid. In some embodiments, the internal chamber of the interior housing (100) may be comprise displacement rings (101) which reduces the volume of the filling lubricant in the internal chamber of the exchanger. In some embodiments, the displacement rings (101) may comprise a low coefficient of thermal expansion (CTE) material.

Figure 13:
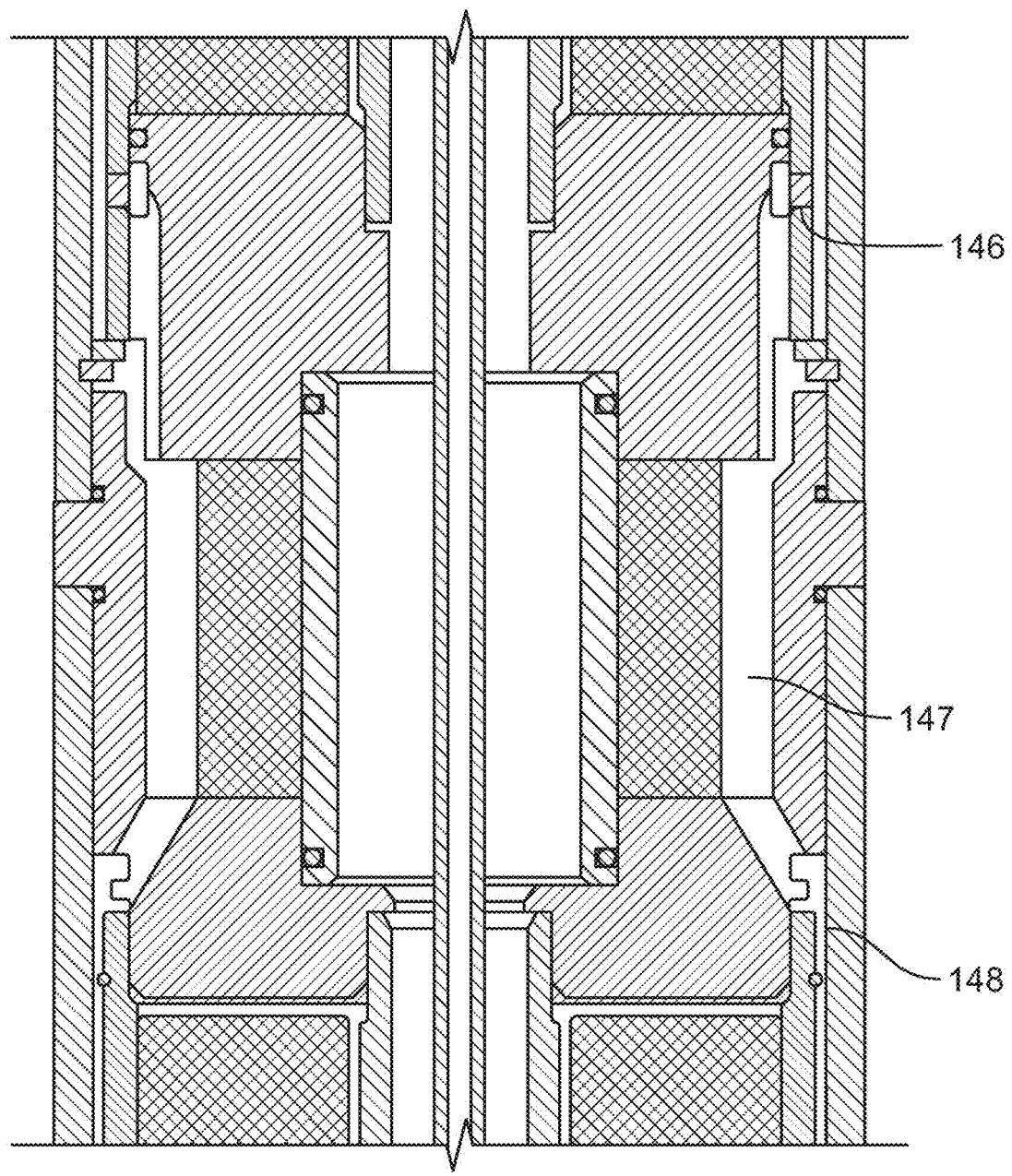
FIG. 13 depicts a schematic of a portion of an exemplary central heat exchange module.

As shown in FIG. 13, once the lubricant reaches the bottom of the central heat exchange module (410) it may enter a connecting coupling via a port (146) and crossover the connection through channels (147) which direct the flow into the outer channel of the lower heat exchange module (450) defined in part by lower heat exchange module exterior housing (148).

Figure 14:
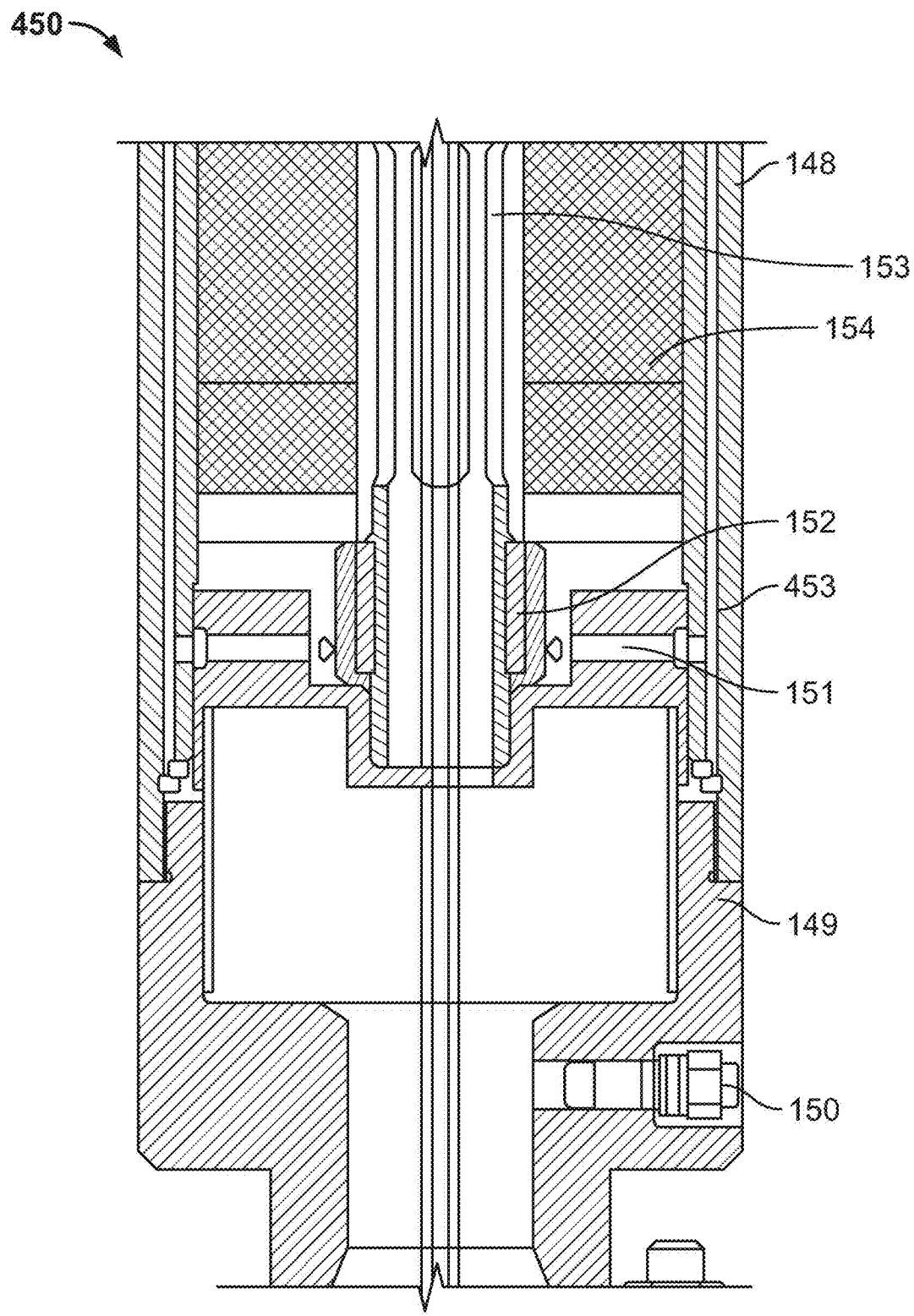
FIG. 14 depicts a schematic of a portion of an exemplary lower heat exchange module.

As shown in FIG. 14, the lower portion of the exterior housing (148) of the lower heat exchange module (450) may have a threaded connection with a bottom flange (149). The bottom flange may be used to connect a downhole sensor and may be fitted with a filling valve (150) which may be used to fill the internal chamber of the heat exchanger with lubricant.

The lubricant may flow through the outer pathway (453) of the lower heat exchanger in order to dissipate heat from the lubricant to the exterior housing and into the well bore fluid. Then lubricant may flow from an outer pathway (453) of the lower heat exchange module (450) into the interior of the lower heat exchange module via ports (151) and may be passed by and/or through a magnet trap (152) to capture any particulate, such as, for example, ferrous wear debris. A lubricant return tube (153) may connect the base and head of the lower heat exchange module (450). In some embodiments, the lubricant return tube (153) may provide rigidity and/or a mounting frame for displacement rings (154). The lubricant return tube (153) may have several openings from the exterior to the interior that may be covered with a fine mesh filter to reduce the number of impurities and/or non-ferrous materials that are introduced into the motor. In some embodiments, this mesh filter may be a screen with substantially uniform pore size. In some embodiments, the pores are at least about 10 µm, or at least about 20 µm, or at least about 25 µm, or at least about 30 µm, or at least about 40 µm wide. In some embodiments, the pores are at most about 10 µm, or at most about 20 µm, or at most about 25 µm, or at most about 30 µm, or at most about 40 µm wide.

Figure 15:
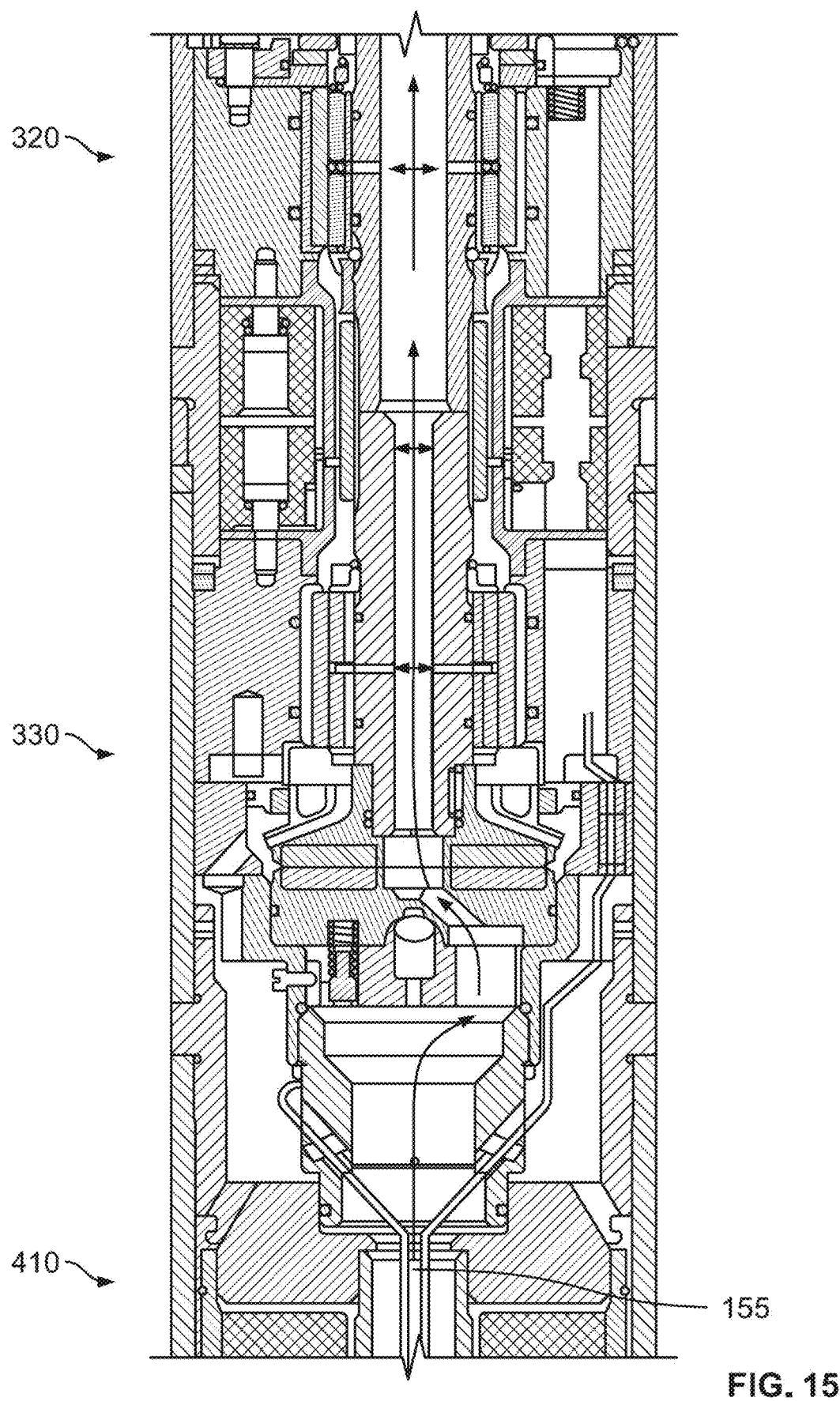
FIG. 15 depicts a schematic of a portion of an exemplary base module with lubricant return.

As shown in FIG. 15, once the lubricant enters the return tube (153) it may travel up through the return tubes of one or a plurality of central heat exchange modules (410) through connecting tubes (155) and/or through a return path until it reaches the motor base module (330). The cooled and filtered lubricant may then be returned through base module shaft (80) to the rotor (66) and then circulated up through the various motor modules and/or seal section before circulating back through the central (410) and lower (450) heat exchange modules.

It will be apparent to one of ordinary skill that elements of the exemplary embodiments described above may be utilized in alternate configurations, in alternate applications, with and/or without any of the other various elements described herein and otherwise known in the art. It will also be apparent that the various elements associated with any embodiment may be utilized with any other embodiment to achieve substantially the same or an analogous result.

High Speed Electric Submersible Pump

Some embodiments of the disclosed inventions belong to the category of equipment related to wellbore fluid production via artificial lift with a downhole submersible pumping unit. Some embodiments include a permanent magnet motor, which may be filled with a coolant and/or lubricant. In some embodiments, the disclosed pump may operate at greater than about 3,000 RPM, or greater than about 5,000 RPM, or greater than about 6,000 RPM, or greater than about 7,000 RPM, or greater than about 9,000 RPM, or greater than about 10,000 RPM. In some embodiments, the disclosed pump may operate at less than about 3,000 RPM, or less than about 5,000 RPM, or less than about 6,000 RPM, or less than about 7,000 RPM, or less than about 9,000 RPM, or less than about 10,000 RPM.

Some embodiments of the disclosed inventions relate to an ESP assembly which is shorter than a standard ESP for a given flow rate and/or head pressure. In some embodiments, the length of a disclosed ESP is less than about 80 feet, or less than about 60 feet, or less than about 50 feet, or less than about 45 feet, or less than about 42 feet, or less than about 35 feet, or less than about 30 feet, or less than about 25 feet, or less than about 20 feet. In some embodiments, the length of a disclosed ESP is more than about 80 feet, or more than about 60 feet, or more than about 50 feet, or more than about 45 feet, or more than about 42 feet, or more than about 35 feet, or more than about 30 feet, or more than about 25 feet, or more than about 20 feet. In some embodiments, the length of a disclosed ESP is greater than about 80 feet, or greater than about 60 feet, or greater than about 50 feet, or greater than about 45 feet, or greater than about 42 feet.

Certain embodiments relate to an ESP assembly comprising a pump module, wherein the pump module comprises a pump shaft and an impeller or impellers, wherein the pump shaft is operably connected to a motor shaft and wherein the impeller is rotationally fixed to the pump shaft by a keyway. In some embodiments, the ESP further comprises a gas separator module and/or an intake module wherein the gas separator comprises a gas separator shaft and an inducer, wherein the gas separator shaft is operably connected to the motor shaft and the inducer is rotationally fixed to the gas separator shaft by a keyway. In some embodiments, the inducer is a variable pitched inducer. In some embodiments, the ESP further comprises a seal section located between a motor module and the pump module, wherein the seal section is configured to transmit torque from the motor shaft to the pump shaft and absorb thrust from the pump module. In some embodiments, the ESP further comprises a motor module, wherein the motor module comprises an AC electric permanent magnet motor configured to operate at a desired rpm, the motor configured to rotate a motor shaft and/or a motor cooling system, wherein the motor cooling system comprises a motor cooling impeller, the motor cooling impeller configured to circulate lubricant through a motor module heat exchanger wherein the motor module heat exchanger comprises a motor module lubricant pathway, the motor module lubricant pathway configured to increase a residence time of the lubricant in the motor module heat exchanger.

In some embodiments, the ESP assembly can be installed in a well with a casing having a drift ID of less than about 8 inches, less than about 7 inches, less than about 6 inches, less than about 5 inches, or less than about 4.6 inches, or less than about 4.1 inches. In some embodiments, the ESP assembly can be installed in a well with a casing having a drift ID of more than about 8 inches, more than about 7 inches, more than about 6 inches, more than about 5 inches, or more than about 4.6 inches, or more than about 4.1 inches. In some embodiments, the ESP assembly can be installed in a well with a casing having a drift ID of about 4.6 inches.

In some embodiments, the ESP assembly has a total dynamic head (TDH) in feet to length in feet ratio of at least about 80, or at least about 100, or at least 150, or at least about 200, or at least about 220, or at least about 230, or at least about 250, or at least about 300. In some embodiments, the ESP assembly has a TDH to length ratio of at most about 80, or at most about 100, or at most 150, or at most about 200, or at most about 220, or at most about 230, or at most about 250, or at most about 300.

In some embodiments, the ESP assembly has a break horse power (BHP) to length in feet ratio of at least about 4, or at or at least about 5, or at least about 7, or at least about 9, or at least about 10, or at least about 10.5, or at least about 12. In some embodiments, the ESP assembly has a BHP to length ratio of at most about 4, or at or at most about 5, or at most about 7, or at most about 9, or at most about 10, or at most about 10.5, or at most about 12.

In some embodiments, the ESP produces at least about 400 barrels per day (bpd), or at least about 1,000 bpd, or at least about 2,000 bpd, or at least about 2,500 bpd, or at least about 3,000 bpd, or at least about 3,500 bpd, or at least about 4,000 bpd, or at least about 5,000 bpd, or at least about 6,000 bpd, or at least about 7,000 bpd, or at least about 7,500 bpd. In some embodiments, the ESP produces at most about 400 barrels per day (bpd), or at most about 1,000 bpd, or at most about 2,000 bpd, or at most about 2,500 bpd, or at most about 3,000 bpd, or at most about 3,500 bpd, or at most about 4,000 bpd or at most about 5,000 bpd, or at most about 6,000 bpd, or at most about 7,000 bpd, or at most about 7,500 bpd. Some embodiments are configured to produce between about 1,000 and about 3,000 bpd without changing the downhole equipment. Preferred embodiments are configured to produce between about 400 and about 4,000 bpd without changing the downhole equipment. As disclosed embodiments are configured to operate over a wide range of production volumes, the same ESP may be used as well production varies. Over the life of an oil and gas well, production may slow. Traditionally, this has required removing one ESP, configured to produce greater volumes of fluid and replacing it with a different ESP configured to produce lower volumes of fluid. This process may be repeated multiple times as the well produces smaller volumes. Each time an ESP or other down hole component is changed or replaced, the corresponding surface equipment may also need to be replaced. Each of these steps can lead to down time, lost or deferred production, and increased inventory requirements. Additionally, there is a risk of losing the well each time it is sealed so that equipment may be removed and/or reinstalled. These downsides can be reduced and/or avoided by utilizing disclosed embodiments which operate over a wide range of production volumes, thereby reducing or eliminating the need to change downhole equipment and/or corresponding surface equipment.

In certain preferred embodiments, the disclosed ESP can be installed in wells where the casing has a drift ID of about 4.6 inches, produces greater than 3,000 barrels per day (bpd), has a TDH in feet to length in feet ratio of at least about 100 and a BHP to length in feet ratio of at least about 5.

In some embodiments of the disclosed ESP assembly, the seal section comprises a port in fluid communication with the exterior environment surrounding the seal section and in fluid communication with an interior chamber or multiple chambers, the interior chamber configured to reduce a pressure differential between the exterior of the assembly to the interior of the assembly.

In some embodiments of the disclosed ESP assembly the seal section comprises a seal section cooling system wherein the seal section cooling system comprises a seal section heat exchanger wherein the seal section heat exchanger comprises a seal section lubricant pathway, the seal section lubricant pathway configured to increase a residence time of the lubricant in the seal section heat exchanger. In such embodiments the seal section may further comprise a seal section lubricant return path.

In some embodiments of the disclosed ESP assembly the seal section and motor lubricant pathways are linked and a single heat exchanger system is utilized to cool both the seal section and the motor module. In such embodiments, the motor lubricant return path may also be linked to the seal section lubricant return path in order to create a continuous and/or linked heat exchange assembly for both the seal section and motor module.

Some embodiments of the disclosed ESP assembly comprising at least one or more than one high-speed self-aligning bearing.

In some embodiments of the disclosed ESP assembly, the motor module heat exchanger comprises an upper heat exchange module and a lower heat exchanger module, the lower heat exchange module comprising a screen configured to trap non-ferrous particles and a magnetic trap configured to trap ferrous particles.

In some embodiments of the disclosed ESP assembly, the seal section comprises a thrust chamber wherein the thrust chamber comprises at least two thrust bearings and wherein each thrust bearing is fitted with a spring damper designed to distribute a thrust load across two thrust bearings. In some embodiments, the spring damper may be designed to distribute the thrust load of the pump across two thrust bearings substantially evenly.

In some embodiments of the disclosed ESP assembly, the motor module comprises a head module, power module, and base module. In some embodiments, the motor module comprises more than one power module. The number of power modules may be adjusted depending on the power requirements of the ESP for a given application.

In some embodiments of the disclosed ESP assembly, at least two power modules are disposed between the head module and base module and a flangeless connection is used to connect the two power modules to each other. In some embodiments, a flangeless connection is used to connect the head module to a power module and/or to connect the base module to a power module.

In some embodiments of the disclosed ESP assembly, the motor module further comprises a stator with a magnetic field wherein the motor rotor is configured to self-align within the magnetic field of the stator.

Some embodiments of the disclosed ESP further comprise an axial seating system, configured to seat a motor rotor. In some embodiments, the axial seating of the rotor within the magnetic field of the stator may vary throughout the operating range of the system. The axial load faces may have slightly different microhardness in order for material to be removed from the lower microhardness face, if and as needed, for the rotor to seat at a given operating point. In axial thrust assemblies, the dynamic face preferably has a higher microhardness than the static face and the static face is preferably of higher compressive strength than that of the dynamic face. The methods and techniques described in ASTM C1424-15, Standard Test Method for Monotonic Compressive Strength of Advanced Ceramics at Ambient Temperature, may be used to determine the compressive strength of a material.

In some embodiments, the dynamic face of an axial thrust assembly comprises materials with a compressive strength of at least about 3,500 Mpa, or at least about 3,700 Mpa, or at least about 4,000 Mpa, or at least about 4,200 Mpa, or at least about 4,500 Mpa. In some embodiments, the dynamic face of an axial thrust assembly comprises materials with a compressive strength of at most about 3,500 Mpa, or at most about 3,700 Mpa, or at most about 4,000 Mpa, or at most about 4,200 Mpa, or at most about 4,500 Mpa.

In some embodiments, the static face of an axial thrust assembly comprises materials with a compressive strength of at least about 7,200 Mpa, or at least about 7,500 Mpa, or at least about 7,800 Mpa, or at least about 8,000 Mpa, or at least about 8,200 Mpa. In some embodiments, the static face of an axial thrust assembly comprises materials with a compressive strength of at most about 7,200 Mpa, or at most about 7,500 Mpa, or at most about 7,800 Mpa, or at most about 8,000 Mpa, or at most about 8,200 Mpa.

In some embodiments, a rotor may be equipped with an axial load face on both the upper and lower ends of the rotor body. The corresponding stator may be equipped with a complementary upper and lower load face configured to absorb and distribute the load to the stator housing when interacting with the rotor surfaces. This arrangement allows the rotor to be preferentially aligned within the magnetic field of the stator throughout its operating range.

Active Cooling System

In some embodiments, an active cooling system is utilized to reduce or maintain the motor temperature and/or lubricant temperature. Disclosed active cooling systems may be utilized with a variety of motors, including, for example, permanent magnet motors and/or induction motors and/or may be utilized with a seal section or other non-motor machinery. It will be appreciated that features and elements of the disclosed active cooling system may be used with other disclosed embodiments as well as other equipment and/or machinery.

Figure 16A:
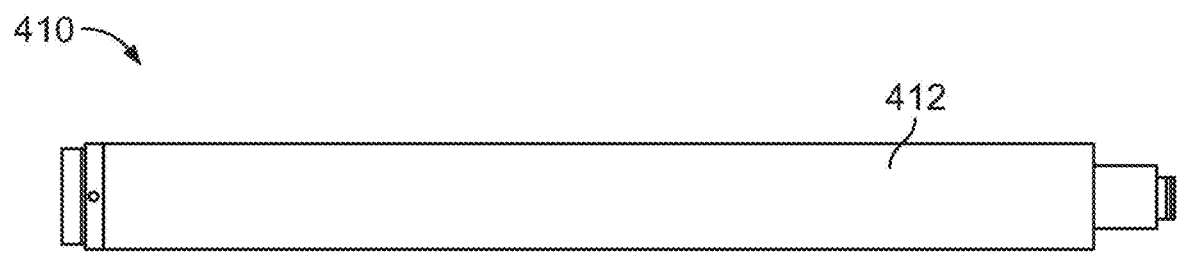
FIGS. 16 A, B, and C, depict schematics of an exemplary central heat exchange module.
Figure 16B:
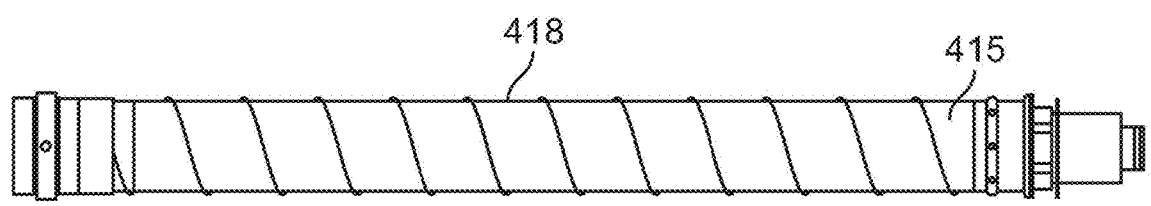
Figure 16C:
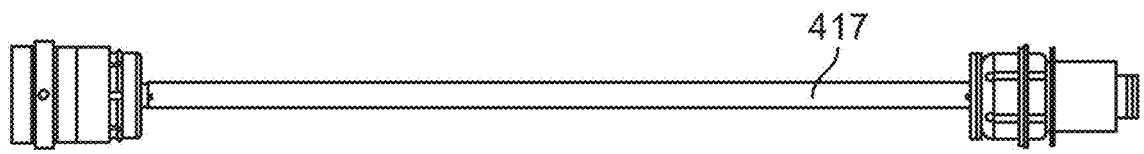

In some embodiments, a motor with the disclosed active cooling system comprises an electric motor, an impeller, at least one central heat exchanger module, and a lower heat exchanger module. Each heat exchanger module typically comprises a head and a base. In disclosed embodiments, the impeller may be arranged to drive lubricant into a central heat exchanger. As shown in FIGS. 16 A-C, in some embodiments the central heat exchanger module (410) comprises an exterior housing (412), an interior housing (415), and a lubricant return tube (417) connected to the head and base of each central heat exchanger module. The interior housing (415) is positioned within the exterior housing (412) and arranged to create a central heat exchanger lubricant pathway (418) between the interior and exterior housing. The lubricant pathway (418) allows a thin layer of lubricant to pass between the interior and exterior housings. This creates a thermal pathway allowing heat to be transferred from the lubricant to the exterior housing and then to the wellbore fluid. In many embodiments, the lubricant pathway (418) is arranged in a helical pattern, which causes the lubricant to flow around the helical pathway, thereby increasing the residence time that the lubricant spends in the heat exchanger and allowing more heat to be transferred from the lubricant to the exterior housing and wellbore fluid. In some embodiments, this helical pathway is created using a wire or similar material wrapped around the exterior of the interior housing (415). Additionally or alternatively, a wire may be wrapped around the interior of the exterior housing, thereby creating a helical lubricant pathway between the interior housing and exterior housing. In preferred embodiments, the helical pathway is created by machining a pathway into the exterior of the interior housing (415).

In some embodiments, the lubricant pathway (418) defined by the space between the interior and exterior housing is at least about 0.04 inches, or at least about 0.06 inches wide, or at least about 0.065 inches wide, or at least about 0.07 inches wide, or at least about 0.1 inches wide, or at least about 0.25 inches wide or at least about 0.5 inches wide. In some embodiments, the lubricant pathway (418) defined by the space between the interior and exterior housing is at most about 0.04 inches, or at most about 0.06 inches wide, or at most about 0.065 inches wide, or at most about 0.07 inches wide, or at most about 0.1 inches wide, or at most about 0.25 inches wide or at most about 0.5 inches wide. In preferred embodiments, lubricant pathway (418) is about 0.0675 inches wide.

Figure 17A:
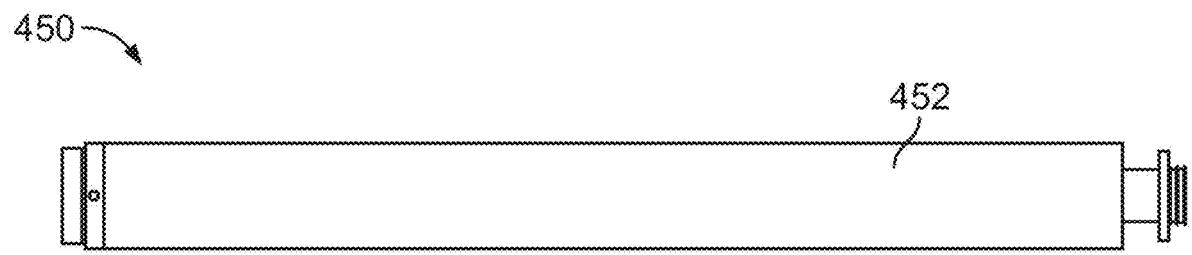
FIGS. 17 A, B, and C depict schematics of an exemplary lower heat exchange module.
Figure 17B:
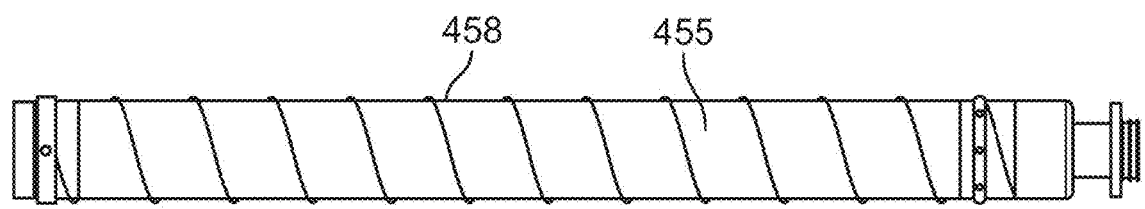
Figure 17C:
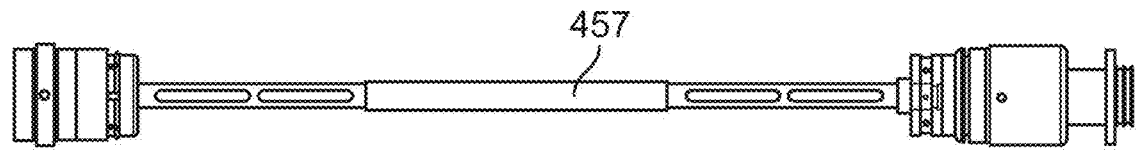

As shown in FIGS. 17 A, B, and C, in some embodiments, a lower heat exchanger (450) comprises a lower exterior housing (452), a lower interior housing (455), and a lower lubricant return tube (457). The lower interior housing (455) may be disposed within the lower exterior housing (452). This arrangement creates a lower heat exchanger lubricant pathway (458) between the interior and exterior housings. The lower lubricant return tube (457) may be disposed within the lower interior housing (455) and be in fluid communication with the lower heat exchanger lubricant pathway (458). As cooling lubricant circulates through the lower heat exchanger (450), it flows into the lower lubricant return tube (457), which may be fluidly connected to a central lubricant return tube (417) which circulates lubricant to the top of the central heat exchanger (410) and back through the motor. The central heat exchanger (410) may be connected to the lower heat exchanger (450) such that the central heat exchanger lubricant pathway (418) is fluidly connected to the lower heat exchanger lubricant pathway (458) and the central lubricant return tube (417) is in fluid communication with the lower lubricant return tube (457). This arrangement allows lubricant to be circulated through the motor and heat exchangers in order to cool the motor and transfer heat from the motor components to the wellbore fluid via the circulating lubricant and heat exchange modules.

In some embodiments, multiple central heat exchanger modules may be arranged in a series. The central heat exchanger modules may be configured such that the lubricant return tube within the interior housing of each central heat exchanger is connectable to the lubricant return tube of a central heat exchanger module above and/or below. The heat exchanger lubricant pathways of each central heat exchanger module may also be configured such that it is connectable with the heat exchanger lubricant pathways of the central heat exchanger modules above and/or below as well. This modular arrangement allows the disclosed active cooling system to be customized based on the needs of a given application. When a greater degree of cooling is needed, additional central heat exchanger modules may be incorporated into the total motor system. This increases the length of the combined lubricant pathway, thereby increasing residence time and allowing a greater amount of heat to be transferred from the lubricant to the wellbore fluid. In applications where total length is a significant concern, a single lower heat exchanger module may be utilized without any central heat exchanger modules. In such embodiments, the lower heat exchanger may be connected to the motor base module. It will be appreciated that the lower heat exchanger module includes a lubricant pathway between the interior housing and exterior housing which dissipates heat from the lubricant to the well bore fluid and also serves to direct lubricant flowing through the lubricant pathway into the lubricant return tubes. This allows lubricant to be circulated throughout either one or a series of heat exchanger modules before being directed back through the motor and/or seal section. In particularly hot wells, additional heat exchanger modules may be added to maintain the motor temperature within a desired range.

In an exemplary embodiment, the disclosed active cooling system may be used in an ESP comprising a motor housing, a stator, and a rotor shaft. In this exemplary embodiment, the rotor shaft comprising an interior and an exterior and the interior of the rotor shaft is in fluid communication with the lubricant return tube of the lower and/or central heat exchange module. The rotor shaft may be arranged such that lubricant flows from the lubricant return tube through the interior of the rotor shaft into the interior of the motor housing between the motor housing and the stator. In some embodiments, the stator may comprise channels which are designed to accommodate the flow of lubricant between the stator and the motor housing.

Some embodiments of the disclosed active cooling system comprise a filter and/or magnetic trap configured to remove particles from the circulating lubricant. In some embodiments, the lower heat exchanger module comprises a screen designed to remove particles including non-ferrous wear products from the circulating lubricant. In some embodiments, the lower heat exchanger module comprises a magnetic trap designed to remove ferrous particles, including wear products from the circulating lubricant. By removing particles, including ferrous and non-ferrous wear product from the circulating lubricant, the active cooling system helps to maintain the quality of the circulating lubricant. This leads to a longer service life of the overall system incorporating the active cooling embodiments disclosed. ESPs which comprise the disclosed active cooling system with screen filter and magnet trap may have a longer service life than traditional ESPs, resulting in improved run life and service time.

In exemplary embodiments, the disclosed active cooling system is used in an ESP. In such embodiments, when the circulating lubricant reaches the top of the upper central heat exchanger module lubricant return tube, it then enters the interior of a motor base shaft and rotor shaft. In some embodiments, the motor base shaft and rotor shaft as part of the lubricant return pathway. The circulating lubricant flows up the rotor shaft to the top of the motor. In some embodiments, the rotor shaft includes holes from the interior of the shaft to the exterior where bushings or other components which may benefit from cooling and/or lubrication are located. These holes allow circulating lubricant to contact bushings, bearings, or other components in order to cool and/or lubricate the components. The lubricant then continues to be circulated through the active cooling system.

In some embodiments, lubricant flows up the rotor shaft of the motor and into the shaft of the seal section. At that point, the lubricant may be directed out of the seal section shaft through holes leading from the interior of the shaft to the exterior where bushings or other components which may benefit from cooling and/or lubrication may be located. In some embodiments, lubricant may be directed out of the seal section shaft by an impeller located on or near the top of the lubricant flow path. The impeller may drive the circulating lubricant through holes leading from the interior of the shaft to the exterior of the shaft. In some embodiments, the lubricant may then flow through the motor module and/or enter the linked lubricant pathway between the interior and exterior housings of the seal section and motor module to dissipate heat before being recirculated through the motor module and seal section.

In some embodiments, once circulating lubricant reaches the top of the motor module, prior to reaching the seal section, the lubricant may be directed out of the rotor shaft by an impeller located on the top of the rotor. The impeller drives the circulating lubricant through exit holes leading from the interior of the rotor shaft to the exterior of the rotor shaft.

In some embodiments, lubricant channels located between the stator and the motor housing direct circulating lubricant between the stator and the housing and may, in some embodiments, direct lubricant through slots of the wound stator core. This path allows lubricant to pick up heat from the interior of the rotor shaft as well as the stator and motor housing. Once the lubricant has flown down the motor, between the stator and housing, the circulating lubricant enters the lubricant pathway of the upper central heat exchanger module where heat may be dissipated to the exterior housing of the head exchanger module and the wellbore fluid in contact with the outside of the exterior housing.

Modular Motor System and Flangeless Connection

As can be seen in FIG. 10A, in some embodiments, the motor system is built in modules that consist of a head module, a power module and a base module. In some embodiments, multiple power modules may be connected via a flangeless connection system in order to reach the desired application power requirements. It will be appreciated that the disclosed module systems and connections may be utilized with any other disclosed element or embodiment as well as with other equipment and/or machinery.

Figure 18:
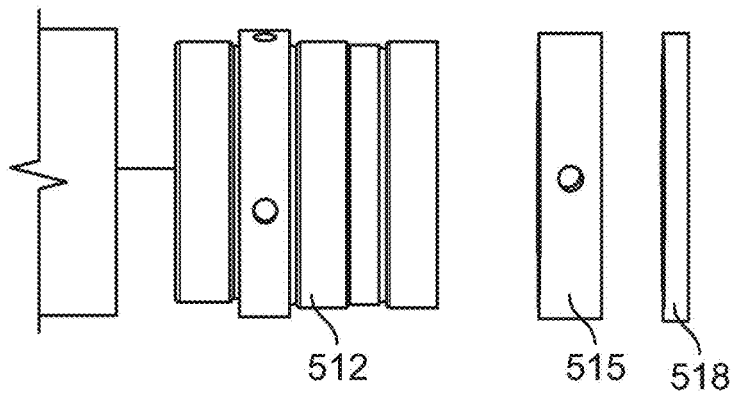
FIG. 18 depicts an exemplary flangeless connection.

In some embodiments, two modules may be connected to each other using a flangeless connection (510). As shown in FIG. 18, in some embodiments, the flangeless connection (510) comprises a single piece housing coupling (512), a lock nut (515), and a spacer ring (518). In some embodiments using the flangeless connection, the two components or modules being joined will have opposite handed threads which turn in different directions. For example, if the lower end of a first power module is to be joined to the upper end of a second power module, the lower end of the first power module may comprise left-handed threads while upper end of the second power module may comprise right handed threads. In some embodiments, the single piece housing coupling comprises opposite handed threads on its upper and lower ends.

In some embodiments, the lock nut and spacer may be installed on the housing coupling. The upper and lower modules to be joined may be engaged with the threads on the single piece housing coupling and simultaneously madeup as the single piece housing coupling is rotated. Once completely madeup the lock nut may be tightened against the spacer ring. Depending on the application, once the modules and/or components are threadedly attached, the components may be secured by welding or another method known to prevent unthreading known in the art.

Some disclosed embodiments relate to a motor for an electric submersible pump assembly, the motor comprising a head module; a base module; and at least two power modules disposed between the head module and base module. In some embodiments, each power module comprises a power module housing having an upper and lower portion; and at least two power modules are connected to each other using a flangeless connection, the flangeless connection comprising a housing coupling, a lock nut, and a spacer ring. In some embodiments, a power module may be connected to a base module and/or a head module using the disclosed flangeless connection regardless of the number of power modules in the ESP assembly.

In some embodiments, the upper portion of the power module housings comprise threads rotating in a certain direction, for example, right handed threads, and the lower portion of the power module housings comprise threads rotating in the opposite direction, for example, left handed threads. In some embodiments, the housing coupling comprises an upper portion and a lower portion, the upper portion of the housing coupling having right or left handed threads to connect to the lower portion of a power module housing and the lower portion of the housing coupling having opposite handed threads to connect to the upper portion of a power module housing.

Disclosed embodiments of the flangeless connection may help to maximize the available motor diameter. The disclosed flangeless connection also reduces and/or eliminates choke points that may inhibit the flow of motor oil, lubricant, and/or dielectric fluid. Embodiments of the disclosed flangeless connection increase the available heat exchanger surface area, thereby allowing greater amounts of heat to be transferred from the motor or other components to the wellbore fluids. Disclosed embodiments also allow the various modules to be coupled in a manufacturing facility rather that at the well site environment. This allows the operator to save time installing an ESP utilizing the disclosed features and leads to increased reliability of the assembled ESP and/or other components.

HSSA Bearing Details

In some embodiments, the disclosed ESP components, as well as other equipment, motors, and/or machinery may comprise high-speed self-aligning (HSSA) bearings. It will be appreciated that the disclosed bearing design may be utilized with any of the disclosed elements or embodiments as well as with other equipment or machinery.

In some embodiments, a module may be equipped with a radial bearing with the dynamic portion of the bearing (the bearing sleeve) being rotationally fixed to a rotating shaft. In such embodiments, the stator may be equipped with a complementary static portion (the bushing) which absorbs and distributes a radial load to the stator housing. The sleeve comprises material which may have a lower microhardness than the bushing. This arrangement allows for the sleeve (the dynamic face) to "wear-in" if necessary in order to reach an improved and/or optimum operating point. In some embodiments, the sleeve will be attached to a rotor which is contained in the magnetic field of the stator. The disclosed arrangement allows the rotor to reach an improved or optimum position within the magnetic field of the stator.

In some embodiments, the sleeve or a sleeve portion of a sleeve assembly may comprise carbide. In certain embodiments, the sleeve comprises tungsten carbide with at least about 4% nickel, or at least about 5% nickel, or at least about 6% nickel, or at least about 7% nickel. In certain embodiments, the sleeve comprises tungsten carbide with at most about 4% nickel, or at most about 5% nickel, or at most about 6% nickel, or at most about 7% nickel.

In some embodiments, the bushing may be mounted on a fixed support using one or multiple elastomeric bands. In some embodiments, the elastomeric bands comprise materials that, when in contact with a coolant, lubricant, and/or dielectric fluid, they will expand and lock the bushing to the support. In some embodiments, the elastomeric bands do not allow any axial or rotational movement of the bushing. In some embodiments, the anchoring strength on the bushing may be increased by adding a groove or helical groove on the outside of the bushing, thereby allowing the bands to "grip" the bushing. The elastomeric band may also help to center the bushing in the bushing support and/or provide a dampening effect in the event of any vibration.

In some embodiments, the bushing may have grooves which allow lubricant to flow between the static and dynamic bearing faces. In radial bearings, the static face is the bushing and the dynamic face is the sleeve. These grooves allow lubricant to flow between the bushing and the sleeve and clear any particulate or debris, such as, for example, debris caused by wearing of the bearing faces. In some embodiments, the lubricant cooling and/or circulation system may comprise a screen and/or magnetic trap to remove such debris as the lubricant is circulated.

In some embodiments, the bushing may comprise an outer bushing body and a bushing insert. The outer body may comprise a low CTE material. The bushing insert comprises a material of a higher microhardness than the associated sleeve.

In some embodiments, a multi-piece bushing may allow for thinner materials to be used. One advantage of thinner materials is that a higher proportion of any thermal growth will be in the axial plane rather than the radial plane. This arrangement allows tight tolerances to be maintained at high speeds and high temperatures.

Figure 19A:
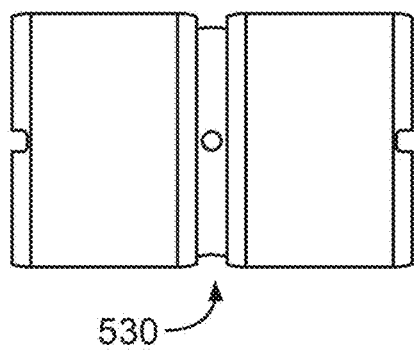
FIG. 19A depicts an exemplary assembled sleeve assembly.
Figure 19B:
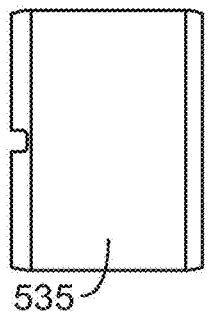
FIGS. 19 B and C depict components of an exemplary sleeve assembly.
Figure 19C:
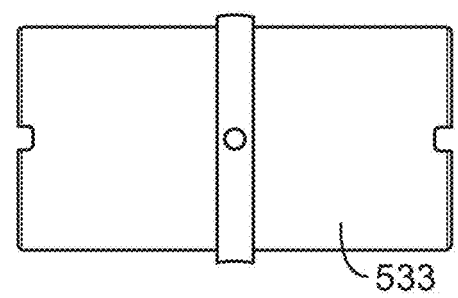

As shown in FIG. 19, in some embodiments, a sleeve assembly (530) comprises a sleeve body (533) and at least two sleeves (535). In such embodiments, the sleeve body (533) and each sleeve (535) comprises a keyway. In some embodiments, the two sleeves (535) may be mounted onto the sleeve body (533) and the sleeve assembly (530) may be mounted onto a rotating shaft using the keyways and associated keys. In some embodiments, the sleeve assembly further comprises an inside limiting nut which may be threaded onto a rotating shaft and limit axial movement of the sleeve assembly. In some embodiments, the limiting nut may hold the keys, for example "L" keys, in the keyway while the sleeve assembly is mounted onto a shaft.

In some embodiments, a tapered centralizing ring may be mounted with a set of keys to provide centralization of the sleeve assembly on the shaft. In some embodiments, an outside limiting nut may be threaded into place but may be stopped prior to contacting the tapered centralizing ring. This arrangement allows for the sleeve assembly to have a small amount of axial movement between the inside and outside limiting nuts in order to assist in the bearing finding an improved or optimum operating point. Once the outside limiting nut is in place the edges of the tapered centralizing ring may be peened into a machined groove on the outside limiting nut.

In some embodiments, a rotor shaft may have elastomeric bands which a sleeve assembly fits around. These elastomeric bands may help to direct lubricant from the interior of the shaft to the exterior of the sleeve body and onto the face of the sleeves. This arrangement allows lubricant circulating within the rotor shaft to lubricate and cool the bearing faces. The elastomeric bands may also help to center the sleeve assembly and dampen any vibration.

In some embodiments, a pump and/or gas separator may comprise HSSA bearings. An HSSA bearing for a pump may be comprise of a bushing and a sleeve. The bushing may be held onto a bushing support by an interference fit or any other technique known in the art. In some embodiments, elastomeric bands may be used to prevent rotation of the bushing, the help center a shaft, and/or to dampen vibration.

In some embodiments a two-piece sleeve may be used. A two-piece sleeve may comprise an outer sleeve and an inner sleeve. The outer sleeve may be keyed to the inner sleeve in order to rotationally fix the inner and outer sleeves of the two-piece sleeve. In some embodiments, the outer sleeve may be fluted and/or comprise a helical groove on the exterior to allow for the removal of particulate or other contaminants and/or to promote the flow of lubricant. In some embodiments, the inner sleeve may be keyed to a shaft via a dual keyway. The inner sleeve may comprise low CTE materials designed to help reduce thermal growth in the radial direction. This arrangement may allow the outer sleeve to be thinner which further reduces radial thermal growth.

In some embodiments, the design of the high-speed self-aligning (HSSA) radial bearings may be based on the concept that at high rotational speed the dynamic face (the rotating sleeve) performs better after finding its optimal or improved running position within the static face (the non-rotating bushing).

To facilitate this process, the materials of the sleeve and bushing should have slightly different microhardness in order for material to be removed from the lower microhardness face, if or as needed, for the bearing to self-align. The sleeve material may additionally be of a higher flexural strength than the bushing material in order to allow it to overcome any bending stresses encountered during the process of self-alignment. To further facilitate the process of self-alignment, in some embodiments, the sleeve assembly may be allowed to move, at least to a degree, in the axial direction. In some embodiments, the sleeve assembly may be allowed to move at least about 20 mils, or at least about 25 mils, or at least about 30 mils, or at least about 40 mils, or at least about 50 mils, or at least about 60 mils, or at least about 70 mils, or at least about 75 mils. In some embodiments, the sleeve assembly may be allowed to move at most about 20 mils, or at most about 25 mils, or at le most ast about 30 mils, or at most about 40 mils, or at most about 50 mils, or at most about 60 mils, or at most about 70 mils, or at most about 75 mils.

Some embodiments of the disclosed inventions relate to a radial bearing assembly suitable for mounting on a rotatable shaft, the radial bearing assembly comprising one or more radial bearings, each bearing comprising a bushing and a sleeve, the bushing and sleeve each comprising an interior and an exterior. The interior of the bushing being in lubricated, engagement with the exterior of the sleeve, wherein the bushing is affixable to a non-rotatable bushing support and comprises a material having a higher microhardness than the sleeve and wherein the sleeve is configured to mount to a rotating shaft and comprises a material having a higher flexural strength than the bushing. In some embodiments, the bushing comprises a material having a microhardness of at least about 2,000 MPa, or at least about 2,500 MPa, or at least about 2,800 MPa, or at least about 3,000 MPa, or at least about 3,200 MPa on the Knoop microhardness scale. In some embodiments, the bushing comprises a material having a microhardness of at most about 2,000 MPa, or at most about 2,500 MPa, or at most about 2,800 MPa, or at most about 3,000 MPa, or at most about 3,200 MPa on the Knoop microhardness scale. In some embodiments, the sleeve comprises a material having a microhardness of at least about 1,000 MPa, or at least about 1,500 MPa, or at least about 1,800 MPa, or at least about 2,000 MPa, or at least about 2,200 MPa on the Knoop microhardness scale. In some embodiments, the sleeve comprises a material having a microhardness of at most about 1,000 MPa, or at most about 1,500 MPa, or at most about 1,800 MPa, or at most about 2,000 MPa, or at most about 2,200 MPa on the Knoop microhardness scale.

The methods and techniques described in ASTM C1326-13, Standard Test Method for Knoop Indentation Hardness of Advanced Ceramics, may be used to determine the microhardness of a material.

In some embodiments, the sleeve comprises a material having a flexural strength of at least about 1,000 Mpa, or at least about 1,300 Mpa, or at least about 1,500 Mpa, or at least about 1,800 Mpa, or at least about 2,000 Mpa. In some embodiments, the sleeve comprises a material having a flexural strength of at most about 1,000 Mpa, or at most about 1,300 Mpa, or at most about 1,500 Mpa, or at most about 1,800 Mpa, or at most about 2,000 Mpa. In some embodiments, the bushing comprises a material having a flexural strength of at least about 300 Mpa, or at least about 300 Mpa, or at least about 400 Mpa, or at least about 450 Mpa, or at least about 500 Mpa. In some embodiments, the bushing comprises a material having a flexural strength of at most about 300 Mpa, or at most about 300 Mpa, or at most about 400 Mpa, or at most about 450 Mpa, or at most about 500 Mpa.

The methods and techniques described in ASTM C1161-02c(2008)e1, Standard Test Method for Flexural Strength of Advanced Ceramics at Ambient Temperature, may be used to determine the flexural strength of a material.

In some embodiments, the bushing interior comprises a plurality of grooves configured to allow lubricant to flow between the bushing and the sleeve and wherein the grooves are configured to discharge debris. In some embodiments, the grooves are at least about 3.0 mm wide, or at least about 4.0 mm wide, or at least about 4.5 mm wide, or at least about 5.0 mm wide. In some embodiments, the grooves are at most about 3.0 mm wide, or at most about 4.0 mm wide, or at most about 4.5 mm wide, or at most about 5.0 mm wide. In certain embodiments, the grooves are about 4.73 mm wide.

Figure 20A:
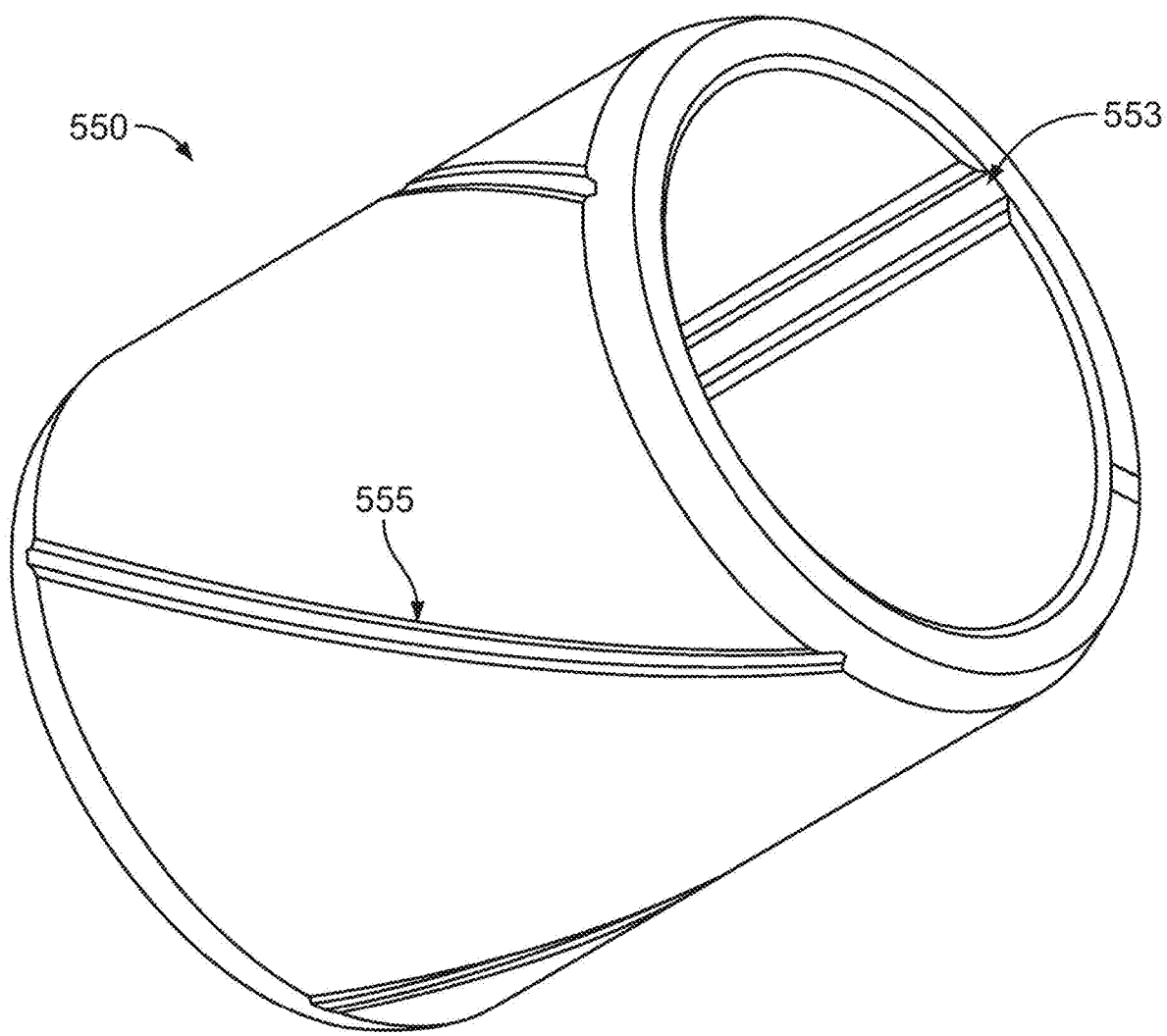
FIGS. 20A and B depict embodiments of a bushing with a surface feature.
Figure 20B:
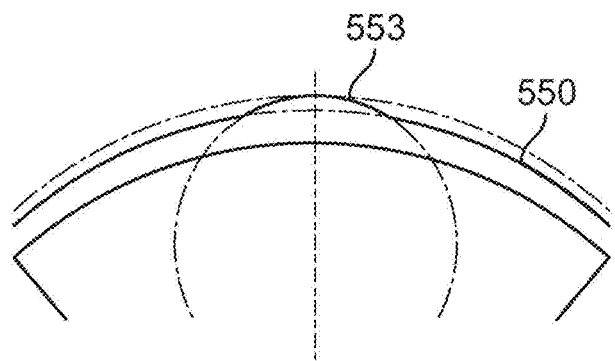
Figure 21:
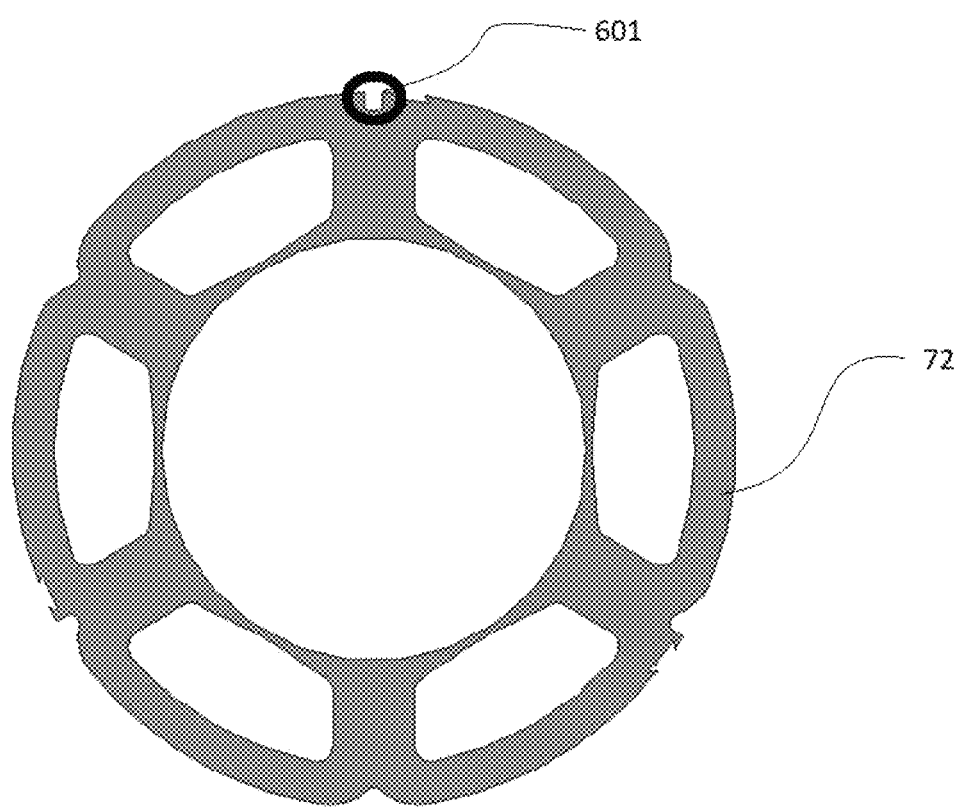
FIG. 21 shows Stator Lamination with Phase Alignment Mark.

In some embodiments, as shown in FIGS. 20A and 20B, the bushing (550) has a surface feature (553) configured to distribute lubricant as the sleeve rotates. The bushing (550) may have an groove, configured to facilitate and/or maintain the build-up of lubricant to be distributed onto the interface of the bushing (550) and sleeve. This surface feature (553) may facilitate removal of particulate. In some embodiments, this surface feature (553) has a larger radius on the leading edge than the trailing edge.

In some embodiments, the radial bearing assembly further comprises an elastomeric band disposed between the bushing exterior and bushing support, the elastomeric band configured to expand when in contact with a lubricant and prevent substantial deleterious movement of the bushing relative to the bushing support. In some embodiments, deleterious movement comprises radial and axial movement. In some embodiments, as shown in FIG. 20A, the radial bearing assembly may further comprise a groove (555) in the bushing exterior wherein the groove is configured to increase binding between the bushing and the elastomeric band. In some embodiments, the groove is helical and the elastomeric band is configured to dampen vibration.

In some embodiments of the radial bearing assembly, the sleeve is axially movable between about 1.5 mm and about 3.0 mm relative to the rotating shaft. In some embodiments, the sleeve may be axially movable relative to the rotating shaft by at least about 0.5 mm, or at least about 0.8 mm, or at least about 1.0 mm, or at least about 1.5 mm, or at least about 2.0 mm, or at least about 2.5 mm, or at least about 3.0 mm, or at least about 3.5 mm, or at least about 4.0 mm. In some embodiments, the sleeve may be axially movable relative to the rotating shaft by at most about 0.5 mm, or at most about 0.8 mm, or at most about 1.0 mm, or at most about 1.5 mm, or at most about 2.0 mm, or at most about 2.5 mm, or at most about 3.0 mm, or at most about 3.5 mm, or at most about 4.0 mm. The allowed axial movement of the sleeve relative to the shaft may allow a rotor shaft to find an improved or optimum position within the magnetic field of a stator.

In some embodiments of the radial bearing assembly, the sleeve comprises two outer sleeves and an inner sleeve body, wherein the two outer sleeves and inner sleeve body each comprise a keyway. In some embodiments, the sleeve body and the rotating shaft each comprise an interior and an exterior. The sleeve body may comprise an opening allowing lubricant to pass from the interior of the sleeve body to the exterior of the sleeve body and the shaft may comprise an opening allowing lubricant to pass from the interior of the shaft to the exterior of the shaft. One or more elastomeric bands may be disposed between the exterior of the shaft and the interior of the sleeve body creating a gap for the flow of lubricant from the interior of the shaft to the exterior of the sleeve body. In some embodiments, the assembly further comprises a screen configured to be in fluid communication with a lubricant, the screen designed to remove wear products from the lubricant. In some embodiments, the assembly further comprises a magnetic trap configured to be in fluid communication with a lubricant, the magnetic trap designed to remove ferrous wear products from the lubricant In some embodiments of the radial bearing assembly the bushing comprises a bushing body and a bushing insert, wherein the bushing insert comprises a material having a higher microhardness than the sleeve and wherein the bushing body comprises a low CTE material. In some embodiments of the radial bearing assembly the sleeve comprises an outer sleeve and an inner sleeve, wherein the inner sleeve comprises a low CTE material. In some embodiments, the low CTE material has a CTE of at least about 3.5, or at least about 4.0, or at least about 4.5, or at least about 5.0, or at least about 5.5 µm/m-° C. In some embodiments, the low CTE material has a CTE of at most about 3.5, or at most about 4.0, or at most about 4.5, or at most about 5.0, or at most about 5.5 µm/m-° C. In certain embodiments, the low CTE material has a CTE of about 4.9. Low cte materials may include, but are not limited to, for example, Invar™, Inovco™, Kovar™, Rodar™ Telcoseal™, Sealvar™, Selvar™, Alloy29-17™, Nilo K™, Dilver™, Pernifer 29-18™, Alloy29-18™, Nicosel™, Nicoseal™, and/or Therlo™.

It will be appreciated that the disclosed bearings may be incorporated into any of the components and/or modules described herein including, but not limited to the pump modules, motor modules, gas separator, and/or seal section.

Symmetrical Rotor

Disclosed embodiments relate to or comprise a rotating rotor. In some embodiments, a symmetrical rotor may allow for a higher grade of balancing to reduce and/or minimize any mechanical vibration when the rotor rotates at operating speeds. It will be appreciated that the disclosed ESP embodiments may comprise a symmetrical rotor and that the features and elements disclosed herein may be used with any other equipment or machinery which utilizes rotating parts, pumps, motors, rotors, and/or stators. The alignment of various components, including for example, shaft splines, keyways, impellers, lubricant holes and/or bearing seats may all impact operation, particularly high-speed operation. A symmetrical rotor may have designated bronze end rings for removal of material to achieve a balance grade of G1 per ISO specification 21940-11:2016. These end rings may be covered with sleeves made of titanium or other materials and sealed with an anaerobic gasket in order to ensure that no material fills the area where material was removed which could lead to future imbalances. It will be appreciated that in some embodiments, the symmetrical rotor is vertically symmetrical in addition to axially and/or radially symmetrical. In some embodiments, a vertically symmetrical rotor does not include an impeller at either end in order to ensure vertical symmetry. In such embodiments, any necessary impellers may be relocated to other areas of the disclosed ESP assembly including, for example, the seal section and/or the top of the lubricant flow path.

Motor Base Thrust Module

Some disclosed embodiments comprise a motor base thrust module. It will be appreciated that elements and feature of the disclosed thrust module may be applied to other embodiments as well as other equipment and/or machinery. A thrust runner may be connected to an impeller in the motor base. In some embodiments, a thrust runner is connected to the bottom of an impeller that drives the motor active cooling system. In such embodiments, the static face may be built into a body and/or assembly that may be axially adjusted to compensate for any variation it the position of the shafts of the power modules.

The static face of the motor base thrust module may be centrally mounted on a pivot head. In some embodiments, the static face may be tensioned using springs that facilitate evenly spreading the load across the bearing. In some embodiments, between 2 and 8 springs may be used. In preferred embodiments, six springs may be used.

In some embodiments of the motor module base thrust module, the dynamic face of the thrust runner may comprise a material with a higher microhardness than the material of the static face. In such embodiments of the thrust module, the static face may comprise a material with a lower microhardness than the dynamic face. The static face may also comprise a material compression of a higher compression strength than the material of the dynamic face.

One of many potential materials known to have a high compression strength is carbon graphite. Carbon graphite is beneficially known to have high compression strength, low coefficient of friction and self-lubricating properties. Carbon graphite materials are known to have a high operational temperature limit which may be beneficial in some embodiments due to the increased friction heat generated by some embodiments of the disclosed pump assembly at higher speeds. Thrust washers may additionally or alternatively comprise, for example, polymeric materials or other materials depending on the application conditions.

In some embodiments, the static and/or dynamic face of the motor base thrust module may comprise grooves. The grooves may be configured to facilitate maintaining a lubricant film or layer between the static and dynamic faces of the motor base thrust module.

Motor Filter and Magnet Trap

Some disclosed embodiments comprise a filter and/or magnet trap for removing non-ferrous and/or ferrous particulate. It will be appreciated that elements and feature of the disclosed filter and magnetic trap may be applied to other embodiments as well as other equipment and/or machinery.

Some embodiments of the disclosed motor system comprise a lower heat exchange module. The lower heat exchange module may comprise a shaft with holes from the outer diameter to the inner diameter. The lower heat exchange module may comprise a filter medium to filter lubricant which passes through the holes. The filter medium may include, but is not limited to screen mesh, fibrous mesh, or any other material capable of filtering non-ferrous contaminants from the circulating lubricant. Some embodiments may comprise a magnet trap configured to catch ferrous debris or other particles that may be produced during the operation of the motor. In some embodiments, the magnet trap may be positioned near the bottom of the lubricant return tube in order to capture any ferrous particles which may settle during circulation.

Dual Bearing Thrust Chamber and Integrated Heat Exchanger

Some disclosed embodiments comprise a dual bearing thrust chamber and/or an integrated heat exchanger. It will be appreciated that elements and feature of the disclosed thrust chamber and heat exchanger may be applied to other embodiments as well as other equipment and/or machinery.

In some embodiments of the disclosed pump assembly, the seal section comprises a dual bearing thrust chamber configured to absorb thrust from the pumps and transmit rotation from the motor to the pumps. In some embodiments, the dual bearing thrust chamber allows axial load to be evenly distributed across two thrust bearings, thereby substantially doubling the amount of thrust the seal chamber can absorb. In some embodiments of the disclosed pump assembly, the axial thrust generated by the pumps is transferred entirely to the thrust bearings in the seal section thrust chamber. In some embodiments, no axial thrust is transferred to any bearing which provides radial support.

In some embodiments, a thrust chamber arranged to transfer thrust from a shaft to a thrust bearing comprises a shaft that is operably connected to at least one impeller. The impeller may be configured to generate downward thrust when it is in operation. The thrust chamber also comprises a thrust chamber outer housing, a first thrust runner, that is coupled to the shaft and comprises an upward facing thrust transferring surface and a downward facing thrust transfer surface. The thrust chamber may also comprise a first thrust bearing assembly coupled to the outer housing; wherein the first thrust bearing assembly comprises an upward facing thrust receiving surface and wherein the first thrust runner is configured to transfer downward thrust from the shaft to the first thrust bearing assembly. In some embodiments, an up-thrust bearing assembly may be coupled to the outer housing, wherein the up-thrust bearing assembly comprises a downward facing thrust receiving surface and wherein the first runner is configured to transfer upward thrust from the shaft to the up-thrust bearing assembly. In some embodiments, a second thrust runner may be coupled to the shaft and comprise a downward facing thrust transfer surface and a second thrust bearing assembly may be coupled to the outer housing, wherein the second thrust bearing assembly comprises an upward facing thrust receiving surface and wherein the second thrust runner is configured to transfer downward thrust from the shaft to the second thrust bearing assembly. Some embodiments may also comprise a first and a second damper, wherein the first damper is configured to absorb downward thrust from the first thrust runner and transfer the downward thrust to the first thrust bearing assembly and the second damper is configured to absorb downward thrust from the second thrust runner and transfer the downward thrust to the second thrust bearing assembly. In such embodiments, the dampers may be configured to spread axial load substantially evenly across at least two thrust bearings.

Preferred embodiments of the disclosed thrust chamber may comprise a thrust chamber heat exchanger, wherein the thrust chamber heat exchanger comprises a thrust chamber interior housing and thrust chamber lubricant return path, wherein the thrust chamber interior housing is disposed within the thrust chamber outer housing and defines a thrust chamber heat exchanger lubricant pathway therebetween. In such embodiments the thrust chamber lubricant return path may be in fluid communication with the thrust chamber lubricant pathway and may be disposed within the interior housing.

In some embodiments, the shaft comprises an interior and an exterior, and the interior of the shaft may be in fluid communication with the lubricant return path. In some embodiments, the up-thrust bearing assembly comprises a static downward facing thrust receiving surface. In some embodiments, the upward facing thrust receiving surfaces of the first and second thrust bearing assemblies have a higher microhardness than the downward facing thrust transfer surfaces of the first and second thrust runners.

In some embodiments, the dampers are configured to distribute substantially even thrust load across the first and second thrust bearing assemblies. In some embodiments, the dampers may comprise Belleville washers and/or stacks of Belleville washers configured in parallel.

In some embodiments, the thrust chamber lubricant pathway is substantially helical.

In some embodiments, the thrust chamber heat exchanger further comprises a filter screen and/or a magnetic trap in fluid communication with the thrust chamber lubricant pathway In some embodiments, the outer thrust housing is threadedly connected to a seal section, and the seal section is disposed between a motor module and a pump module. In some embodiments, the pump module comprises an impeller that generates downward thrust when in operation, and the downward thrust generated by the impeller is communicated to the thrust chamber shaft and transferred by the first and second thrust runners to the first and second thrust bearing assemblies which are axially fixed to the thrust chamber outer housing.

In certain embodiments, the lubricant pathway of the seal section thrust chamber may be in fluid communication with the lubricant pathway of the motor module heat exchangers, thereby creating a unified active cooling system for the motor assembly and seal section. In embodiments which utilize at least one active cooling system, the cooler lubricant may allow for a more viscous lubricant film to be maintained between an axial thrust transferring and thrust receiving surface. This viscous lubricant layer may help extend the life of the seal section thrust chamber as well as the other thrust transferring and/or lubricated components.

In addition to being utilized to cool motors, the disclosed active cooling system may be utilized with a seal section. The disclosed seal section may comprise an impeller, interior housing, exterior housing, and lubricant return path. The housings may be arranged to create a seal section lubricant pathway between the interior and exterior seal housings. Lubricant may be driven by the impeller to flow through the lubricant pathway, thereby dissipating heat from the lubricant to the exterior seal housing and wellbore fluid. The lubricant may then be circulated through the lubricant return path to the interior of the seal section before circulating back through the lubricant pathway. In preferred embodiments, the disclosed seal section cooling systems comprise a screen and magnetic trap to remove ferrous and non-ferrous particles from the circulating lubricant.

In some embodiments, the disclosed active cooling system may be utilized with both a motor and seal section. In such embodiments, the seal section lubricant pathway may be fluidly connected to the central heat exchangers of the motor section. The lubricant return tube of the lower heat exchanger module may be fluidly connected to the lubricant return tubes of the central heat exchanger modules and also to the lubricant return path of the seal section heat exchanger modules. This arrangement allows circulating lubricant to cool and lubricate the components of the associated motor and seal section. This arrangement further allows lubricant in the seal section to be cooled by as many heat exchange modules as are required to maintain the desired operating temperature relative to the wellbore fluid. In some embodiments, the heat exchanger modules may be configured to maintain the temperature of the circulating lubricant to less than about 15° C. above the temperature of the wellbore fluid, or less than about 10° C. above the temperature of the wellbore fluid, or less than about 7° C. above the temperature of the wellbore fluid, or less than about 5° C. above the temperature of the wellbore fluid. In some embodiments, the heat exchanger modules may be configured to maintain the temperature of the circulating lubricant to more than about 15° C. above the temperature of the wellbore fluid, or more than about 10° C. above the temperature of the wellbore fluid, or more than about 7° C. above the temperature of the wellbore fluid, or more than about 5° C. above the temperature of the wellbore fluid.

In some alternative embodiments of the disclosed pump assembly may be arranged to pump more wellbore fluid, and thereby generate more downward thrust than some embodiments of the seal section thrust chamber is designed to absorb. In such embodiments, pump modules may be configured to comprise a thrust runner and thrust absorbing assembly. In some embodiments, the pump module thrust absorbing assembly may be self-leveling. The pump module thrust absorbing assembly may comprise bushings and sleeves for radial support in addition to thrust runners and thrust absorbing surfaces for absorbing axial support.

Gas Separator Inducer and Carbide Lined Separation Chamber

Some disclosed embodiments comprise a gas separator inducer and/or a carbide lined separation chamber. It will be appreciated that elements and feature of the disclosed gas separator and separation chamber may be applied to other embodiments as well as other equipment and/or machinery.

In some embodiments, the disclosed ESP assembly comprises a gas separator configured to separate gas phase and liquid phase. In some embodiments, the gas separator comprises an inducer, for example a variable pitch and/or helical inducer. In some embodiments, the inducer may comprise vanes inclined towards the liquid flow path. In some embodiments, a separation chamber may be lined with carbide inserts and/or comprise abrasion resistant materials configured to prevent erosional wear from abrasive solids. Some embodiments of the disclosed gas separator may further comprise elastomeric bands connected to the carbide inserts, the elastomeric bands configured to dampen and/or mitigate vibration.

Aligned Permanent Magnet Motors Embodiments

Two, three, four or more permanent magnet synchronous motors may be employed in series with any of the embodiments described above. It is generally desirable to properly align motors when employing two or more motors.

In one embodiment the present application pertains to a process for aligning two or more permanent magnet motors each having a rotor and a stator. Advantageously, the process can be used in conjunction with the various embodiments of an electrical submersible pump described above. Generally, the process involves making a phase identifying mark on each stator of the two motors to be connected. The phase identifying mark may be employed to start a winding on each stator at the phase identifying mark. The type of mark is not particularly critical and may vary depending upon the type of stator, other components, and the like. For example, the phase identifying mark may comprise a mark machined onto the stator, a painted mark, or an adhered mark.

The process generally comprises making a pole identifying mark on each rotor of the two motors to be connected. As with the phase identifying mark the type or manner of making the pole identifying mark is not particularly critical and may vary. For example, the pole identifying mark may comprise a mark machined onto the rotor, a painted mark, or an adhered mark. In one embodiment, the pole identifying mark comprises a notch on an end of the rotor shaft wherein the notch is configured to mate with a coupling alignment notch as shown in for example, FIGS. 30A, 30B and 31.

Advantageously, the phase identifying marks may be used to align the phases of the stators while the pole identifying marks to align the poles of the rotors. In some embodiments it may be desirable to install each stator in one or more motor housings. If so, then it may be desirable to somehow indicate the location of the phase identifying mark on the exterior of the motor housing. That is, a symbol, machining, label, or other indication is made on the exterior of the motor housing to indicate that the phase identifying mark lies immediately below said symbol, machining, label, or other indication.

In another embodiment the present application relates to an electric motor (sometimes referred to as a motor module or power module above) for an electric submersible pump. The electric motor typically includes a first and a second permanent magnet motor. The first permanent magnet electric motor comprises a first rotor with a first pole identifying mark and a first stator with a first phase identifying mark. The second permanent magnet electric motor comprises a second rotor with a second pole identifying mark and a second stator with a second phase identifying mark. The type of phase identifying and pole identifying mark is not particularly critical so long as the marks may be employed to substantially align the phases of the first and second stators and to substantially align the poles of the first and second rotor.

The first and second permanent magnet motors may be coupled in any convenient manner. In one embodiment the first permanent magnet motor comprises threads on an inner diameter which turn in a first direction and wherein the second permanent magnet motor comprises threads on an inner diameter which turn in a second direction. A single-piece housing such that described above, e.g., flangeless connection, may be employed to connect the two motors. Such a single-piece housing coupling may comprises a first end and a second end. The first end of the single-piece housing coupling comprises threads on an outer diameter which turn in a first direction while the second end of the single-piece housing coupling comprises threads on an outer diameter which turn in a second direction. In this manner the first permanent magnet motor may be joined to the second permanent magnet electric motor using the threads on the single-piece housing coupling, the threads on the first permanent magnet motor, and the threads on the second permanent magnet motor. Of course, if desired the threads on the motors may be on an outer diameter while the threads on the coupling are in the inner diameter. As described above, in some embodiments one or more motor housings may be employed wherein the exterior of the motor housing indicates the location of the first and second phase identifying mark.

The first and second permanent magnet electric motor may be configured for any convenient voltage. Typically, a relatively low variable speed drive below 800 volts, or below about 500 volts is employed and connected to a step-up transformer which is then connected to one or more permanent magnet electric motors. The motor generally comprised 2-20 poles with 4 poles being preferred. The rotor and stator may be made of any materials normally employed and in some embodiments the rotor is a solid steel bar rotor. Advantageously, two or more coupled permanent magnet electric motors which are substantially aligned may be employed in, for example, a power module of an electric submersible pump. Other components such as those described above may be employed in the electric submersible pump. Such components include, for example, a head module; a base module; heat exchangers, seal section, motor cooling systems, thrust chambers, radial bearing assemblies, and other embodiments described herein.

The specifications such as diameter of motor housing, voltage, amps, and horsepower of each permanent magnet electric motor to be employed in series may vary depending upon the desired application and other components of the electric submersible pump. In some embodiments the diameter of the motor housing may be from about three to about 4.25 inches or more, preferably from about 3.5 inches to about 4 inches, and more preferably about 3.75 inches. The voltage of each permanent magnet electric motor may range from at least about 400, or at least about 500, or at least about 600 up to about 1000, or up to about 800, or up to about 700 volts. The amperage of each permanent magnet electric motor may vary in some embodiments from at least about 50, or at least about 60, or up to about 150, or up to 100, or up to 80 amps. The horsepower of each permanent magnet electric motor may generally range from at least about 40, or at least about 60 up to about 120, or up to about 100 horsepower. Generally, the volts, amps, and horsepower increase as the diameter of the motor housing increases.

FIGS. 21-27 shows a series of drawings relating to stator phase alignment. The circled phase alignment mark 601 in FIG. 21 indicates where in the stator 72 that winding is started. The phase alignment mark 601 depicted is machined but any suitable indication or marking will work.

Figure 22:
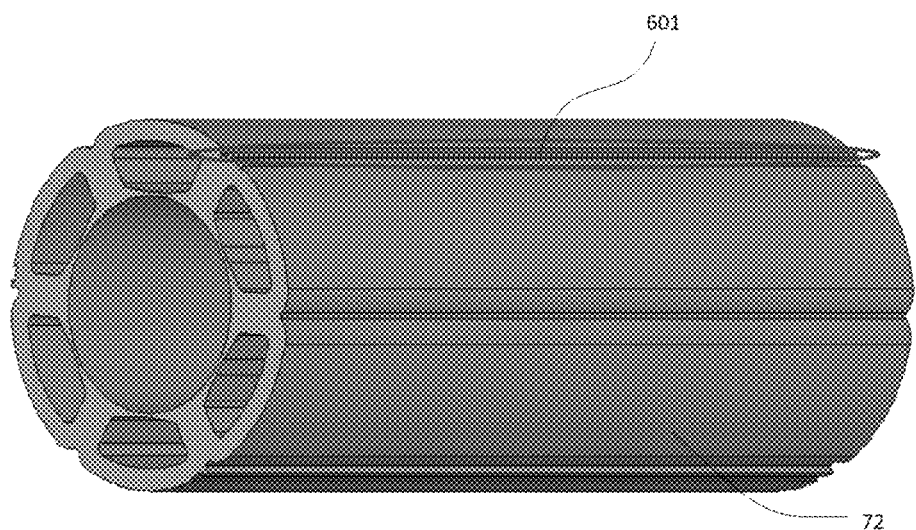
FIG. 22 shows Stack Lamination with Phase Alignment Mark.
Figure 23:
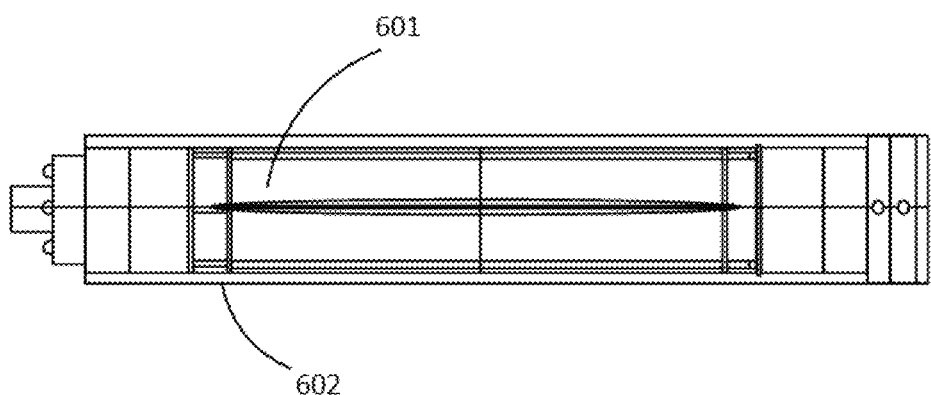
FIG. 23 shows Stator Alignment Mark when installed in motor Housing.
Figure 24:
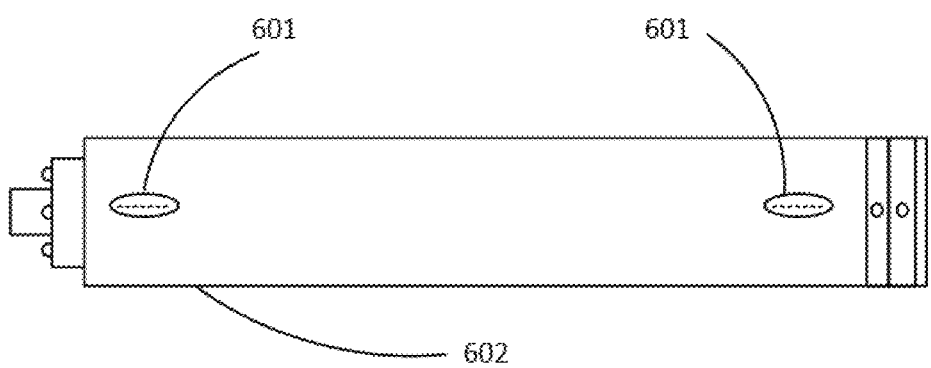
FIG. 24 shows Stator Alignment Mark transferred to outside of Motor Housing when assembled.
Figure 25:
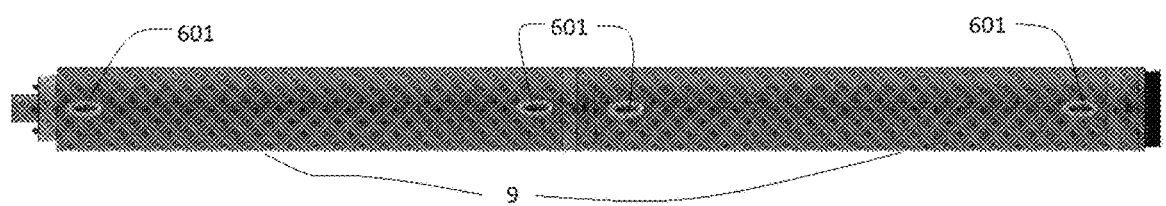
FIG. 25 shows Phases aligned when motors coupled together.
Figure 26:
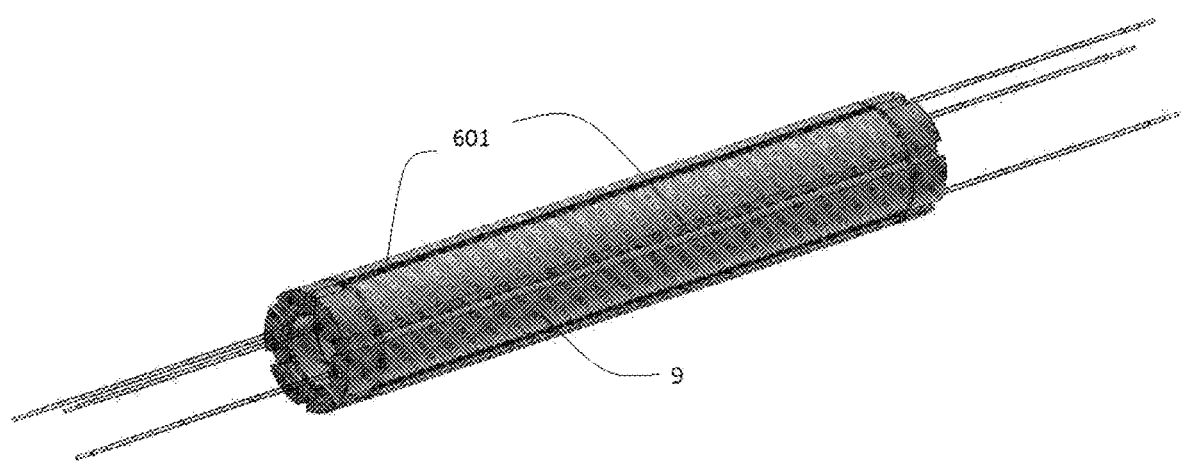
FIG. 26 shows Phases aligned.
Figure 27:
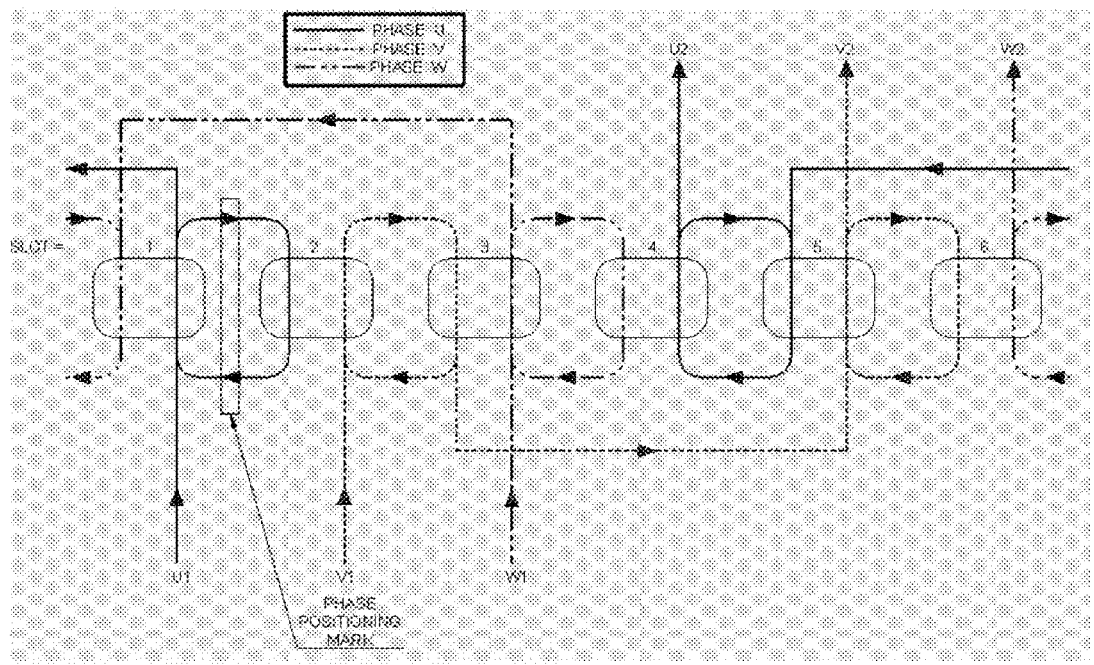
FIG. 27 shows Phase U, V, and W windings.

FIG. 22 shows the stack lamination (without core) with phase alignment mark 601 on the stator 72. FIG. 23 depicts the phase alignment mark 601 on the stator 72 when installed in motor housing while FIG. 24 depicts the phase alignment mark reproduced at the proper location on the exterior of motor housing 602 when assembled. FIG. 25 depicts where the phases are aligned via the markings 601 when the motors 9 are coupled. FIG. 26 shows phases aligned. The Phase U, V, and W windings are then shown in FIG. 27.

Figure 28:
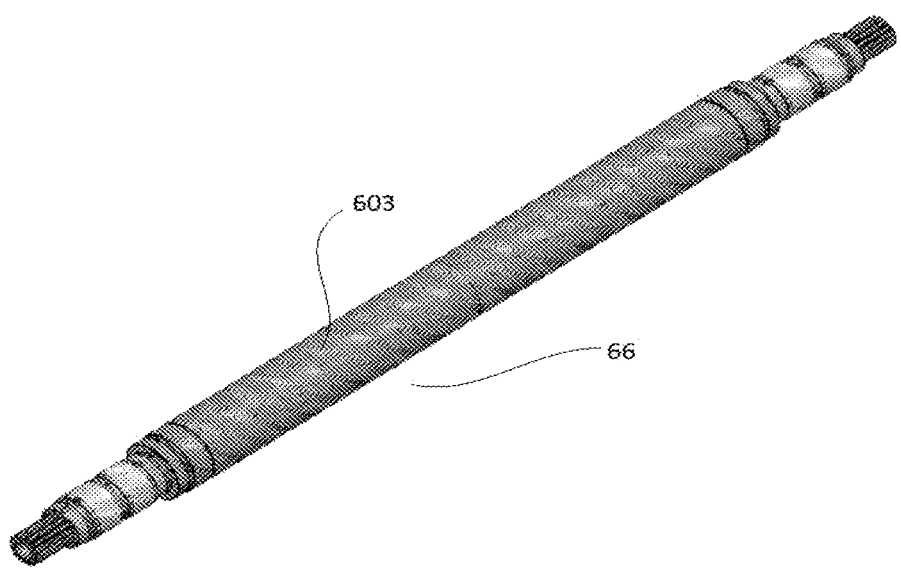
FIG. 28 shows Rotor shown with Retention sleeve.
Figure 31:
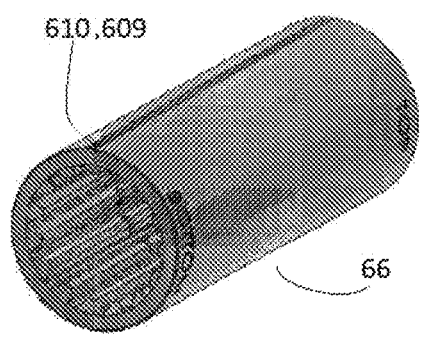
FIG. 31 shows Coupling alignment notch lined up with Pole Position Notch to align Rotors.
Figure 32:
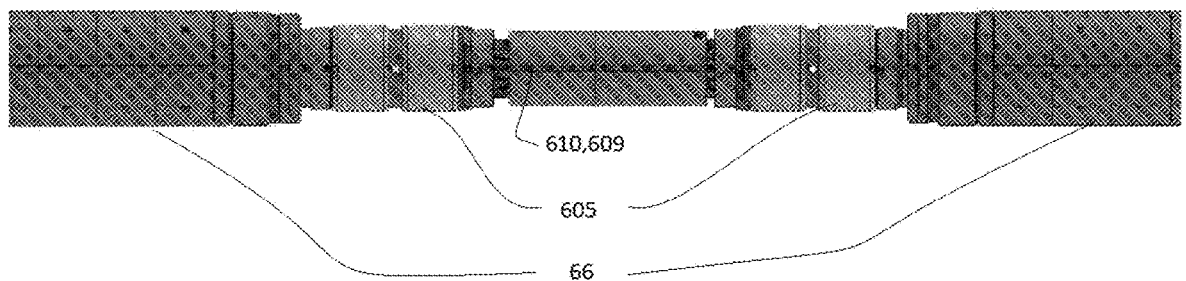
FIG. 32 shows Rotors coupled together with poles aligned.

The depictions in FIG. 28-32 relate to rotor pole alignment features. FIG. 28 shows the rotor 66 with its corresponding retention sleeve 603. FIG. 29 shows the rotor 66 with dividing strip 604 between magnetic poles 605. FIGS. 28-29 show the rotor 66 with and without its corresponding retention sleeve 603, respectively. FIGS. 30A-30B show the pole division 606 aligned with keyways 607 and pole position notch 609, which is one kind of the pole identifying mark, on end of shaft of the pole 605. Of course, other markings or indicators beside the pole position notch 609 at that specific location may be employed. The coupling with an associated notch (i.e. a coupling alignment notch) 610 may then be aligned with the pole position notch 609 as shown in FIG. 31. The coupling alignment notch 610 is lined up with the pole position notch 609 to align rotor 66. The rotors 66 coupled together with aligned poles 605 are then shown in FIG. 32 using the flangeless connection described above.

It will be understood that the various disclosed embodiments may incorporate some or all of the components described herein. The particular components and the properties thereof may be adjusted based on the properties of each particular embodiment and application conditions. From the foregoing description, one of ordinary skill in the art can easily ascertain the essential characteristics of this disclosure, and without departing from the spirit and scope thereof and can make various changes and modifications to adapt the disclosure to various usages and conditions. The embodiments described hereinabove are meant to be illustrative only and should not be taken as limiting of the scope of the disclosure.

REPRESENTATIVE EMBODIMENTS

ESP Embodiments

1. An electric submersible pump assembly, comprising:
a pump module, wherein the pump module comprises a pump shaft and an impeller, wherein the pump shaft is operably connected to a motor shaft and wherein the impeller is rotationally fixed to the pump shaft by a keyway;
a seal section, wherein the seal section is configured to transmit torque from the motor shaft and absorb thrust from the pump module;
a motor module, wherein the motor module comprises a motor configured to operate at greater than 4,000 rpm, the motor configured to rotate a motor shaft; and
a motor cooling system, wherein the motor cooling system comprises a motor cooling impeller, the motor cooling impeller configured to circulate lubricant through a motor module heat exchanger wherein the motor module heat exchanger comprises a motor module lubricant pathway, the motor module lubricant pathway configured to increase a residence time of the lubricant in the motor module heat exchanger.

2. The assembly of embodiment 1, further comprising a gas separator module wherein the gas separator comprises a gas separator shaft and an inducer, wherein the gas separator shaft is operably connected to the motor shaft and the inducer is rotationally fixed to the gas separator shaft by a keyway.

3. The assembly of embodiment 1, further comprising a fluid in-take.

4. The assembly of embodiment 1, wherein the seal section comprises a port in fluid communication with the exterior environment surrounding the seal section and in fluid communication with an interior chamber, the interior chamber configured to reduce a pressure differential between the pressure from the exterior of the assembly to the interior of the assembly.

5. The assembly of embodiment 1, wherein the seal section comprises a seal section cooling system wherein the seal section cooling system comprises a seal section heat exchanger wherein the seal section heat exchanger comprises a seal section lubricant pathway, the seal section lubricant pathway configured to increase a residence time of the lubricant in the seal section heat exchanger.

6. The assembly of embodiment 5, wherein the seal section lubricant pathway is in fluid communication with the motor module lubricant pathway 7. The assembly of embodiment 1, further comprising a high-speed self-aligning bearing, the high-speed self-aligning bearing comprising a bushing and a sleeve, the bushing having a microhardness of at least about 2,500 MPa and the sleeve having a microhardness of at most about 2,000 MPa 8. The assembly of embodiment 1 wherein the motor module heat exchanger comprises a central heat exchanger module and lower heat exchanger module, and wherein the lower heat exchanger module comprises a screen configured to trap non-ferrous particles and a magnetic trap configured to trap ferrous particles.

9. The assembly of embodiment 1, wherein the seal section comprises a thrust chamber wherein the thrust chamber comprises at least two thrust bearings and wherein each thrust bearing is fitted with a spring damper.

10. The assembly of embodiment 1, wherein the motor module comprises a head module, power module, and base module.

11. The assembly of embodiment 10, further comprising at least two power modules disposed between the head module and base module, wherein a flangeless connection is used to connect the two power modules to each other.

12. The assembly of embodiment 10, wherein a flangeless connection is used to connect the head module to a power module and wherein a flangeless connection is used to connect the base module to a power module.

13. The assembly of embodiment 1, wherein the motor module further comprises a stator with a magnetic field and wherein the motor rotor is configured to self-align within the magnetic field of the stator.

14. The assembly of embodiment 13, further comprising an axial seating system comprising a static thrust receiving face and a dynamic thrust transferring face, wherein the dynamic face has a higher microhardness than the static face and the static face has a higher compressive strength than the dynamic face.

15. The assembly of embodiment 14, wherein the dynamic thrust transferring face has a compressive strength of at most about 4,500 Mpa and the static thrust receiving face has a compressive strength of at least about 7,200 Mpa.

16. The electric submersible pump assembly of embodiment 1, wherein the assembly has a total dynamic head in feet to length in feet ratio of between about 80 and about 300.

17. The electric submersible pump assembly of embodiment 1, wherein the assembly has a break horse power to length in feet ratio of between about 4 and about 12.

18. The electric submersible pump assembly of embodiment 1, wherein the assembly is configured to produce between about 400 barrels per day and about 4,000 barrels per day without changing the electric submersible pump.

19. A process for producing well bore fluid comprising:
deploying an electric submersible pump within a wellbore, wherein the electric submersible pump comprises:
a pump module comprising a pump shaft and an impeller, wherein the pump shaft is operably connected to a motor shaft;
a seal section wherein the seal section is configured to transmit torque from the motor shaft to the gas separator shaft and absorb thrust;
a motor module comprising an electric motor configured to rotate a motor shaft; and
a motor cooling system comprising a motor cooling impeller configured to circulate lubricant through a motor module heat exchanger, the motor module heat exchanger comprising a motor module lubricant pathway, the motor module lubricant pathway configured to increase a residence time of the lubricant in the motor module heat exchanger,
operating the electric submersible pump; and
producing well bore fluid.

20. The process of embodiment 19, wherein the seal section comprises a seal section heat exchanger comprising a seal section lubricant pathway.

Active Cooling System Embodiments

1. An actively cooled motor assembly for driving an electric submersible pump, the assembly comprising:
an electric motor, wherein the motor comprises an impeller, a central heat exchanger, and a lower heat exchanger, the impeller arranged to drive lubricant into the central heat exchanger;
the central heat exchanger comprising a central exterior housing, a central interior housing, and a central lubricant return tube, wherein the central interior housing is disposed within the central exterior housing and defines a central heat exchanger lubricant pathway therebetween, and wherein the central lubricant return tube is disposed within central interior housing;
the lower heat exchanger comprising a lower exterior housing, a lower interior housing, and a lower lubricant return tube, wherein the lower interior housing is disposed within the lower exterior housing and defines a lower heat exchanger lubricant pathway therebetween, and wherein the lower lubricant return tube is disposed within the lower interior housing and is in fluid communication with the lower heat exchanger lubricant pathway;
wherein the central heat exchanger is connected to the lower heat exchanger such that the central heat exchanger lubricant pathway is in fluid communication with the lower heat exchanger lubricant pathway and the central lubricant return tube is in fluid communication with the lower lubricant return tube.

2. The assembly of embodiment 1, further comprising a motor housing, a stator, and a rotor shaft wherein the rotor shaft is disposed within the stator and the stator is disposed within the motor housing;
the rotor shaft comprising an interior and an exterior, the interior of the rotor shaft in fluid communication with the central lubricant return tube and the interior of the motor housing;
the rotor shaft arranged such that lubricant may flow from the central lubricant return tube through the interior of the rotor shaft into the interior of the motor housing and between the motor housing and the stator.

3. The assembly of embodiment 2, wherein the stator has channels, designed to accommodate lubricant between the stator and the motor housing.

4. The assembly of embodiment 2, further comprising an electric submersible pump, wherein the motor is operably connected to the pump.

5. The assembly of embodiment 1, further comprising a first central heat exchanger and a second central heat exchanger, wherein central heat exchanger lubricant pathway of the first central heat exchanger is in fluid communication with the central heat exchanger lubricant pathway of the second central heat exchanger and the central heat exchanger lubricant pathway of the second central heat exchanger is in fluid communication with the lower heat exchanger lubricant pathway of the lower heat exchanger.

6. The assembly of embodiment 1, further comprising a screen designed to remove non-ferrous wear products from circulating lubricant and a magnetic trap designed to remove ferrous wear products from circulating lubricant.

7. The assembly of embodiment 4, further comprising a seal section located between the motor and the pump, the seal section comprising a thrust chamber, an impeller, an interior seal housing, an exterior seal housing, and a seal lubricant return path, wherein the interior seal housing is disposed within the exterior seal housing and defines a seal lubricant pathway therebetween, the seal lubricant pathway in fluid communication with the seal lubricant return path and the seal lubricant return path in fluid communication with the thrust chamber; the impeller configured to drive lubricant into the seal lubricant pathway.

8. The assembly of embodiment 6, wherein the screen and magnetic trap are located within the lower heat exchanger lubricant pathway.

9. The assembly of embodiment 6, wherein the screen and magnetic trap are located within the seal lubricant pathway.

10. The assembly of embodiment 1, wherein the central heat exchanger lubricant pathway and lower heat exchanger lubricant pathway are substantially helical.

11. The assembly of embodiment 7, wherein the seal lubricant pathway is substantially helical.

12. The assembly of embodiment 7, wherein the seal lubricant pathway is in fluid communication with the central heat exchanger lubricant pathway and lower heat exchanger lubricant pathway.

13. An actively cooled motor assembly for driving a pump, the assembly comprising:
  an electric submersible pump;
  an electric motor operably connected to the pump, wherein the motor comprises an impeller and a heat exchanger, the impeller arranged to drive lubricant into the heat exchanger; and the heat exchanger comprising an exterior housing, an interior housing, and a lubricant return tube, wherein the interior housing is disposed within the exterior housing and defines a heat exchanger lubricant pathway therebetween, and wherein the lubricant return tube is disposed within the interior housing and is in fluid communication with the heat exchanger lubricant pathway.

14. The assembly of embodiment 13, further comprising a motor housing, a stator, and a rotor shaft wherein the rotor shaft is disposed within the stator and the stator is disposed within the motor housing;
  the rotor shaft comprising an interior and an exterior, the interior of the rotor shaft in fluid communication with the lubricant return tube and the interior of the motor housing;
  the rotor shaft arranged such that lubricant may flow from the lubricant return tube through the interior of the rotor shaft into the interior of the motor housing and between the motor housing and the stator.

15. The assembly of embodiment 14, further comprising a seal section located between the motor and the pump, the seal section comprising a thrust chamber, an impeller, an interior seal housing, an exterior seal housing, and a seal lubricant return path, wherein the interior seal housing is disposed within the exterior seal housing and defines a seal lubricant pathway therebetween, the seal lubricant pathway in fluid communication with the seal lubricant return path and the seal lubricant return path in fluid communication with the thrust chamber; the impeller configured to drive lubricant into the seal lubricant pathway.

Flangeless Connection Embodiments

1. A motor for an electrical submersible pump assembly, the motor comprising:
  a head module;
  a base module;
  at least two power modules disposed between the head module and base module wherein each power module comprises an electric motor and a power module housing having an upper and lower portion; and wherein at least two power modules are connected to each other using a flangeless connection, the flangeless connection comprising a housing coupling, a lock nut, and a spacer ring.

2. The motor of embodiment 1, wherein the upper portion of the power module housings comprise threads and the lower portion of the power module housings comprise threads which turn in the opposite direction as the threads of the upper portion, and
  wherein the housing coupling comprises an upper portion and a lower portion, the upper portion of the housing coupling having threads configured to connect to the lower portion of a power module housing and the lower portion of the housing coupling having threads configured to connect to the upper portion of a power module housing.

3. The motor of embodiment 1, wherein the head module is connected to a first power module using a flangeless connection and wherein the base module is connected to a second power module using a flangeless connection.

4. The motor of embodiment 1, further comprising a heat exchanger.

5. The motor of embodiment 1, further comprising an impeller, a central heat exchanger, and a lower heat exchanger, the impeller arranged to drive lubricant into the central heat exchanger;
  the central heat exchanger comprising a central exterior housing, a central interior housing, and a central lubricant return tube, wherein the central interior housing is disposed within the central exterior housing and defines a central heat exchanger lubricant pathway therebetween, and wherein the central lubricant return tube is disposed within the central interior housing;
  the lower heat exchanger comprising a lower exterior housing, a lower interior housing, and a lower lubricant return tube, wherein the lower interior housing is disposed within the lower exterior housing and defines a lower heat exchanger lubricant pathway therebetween, and wherein the lower lubricant return tube is disposed within the lower interior housing and is in fluid communication with the lower heat exchanger lubricant pathway;
  wherein the central heat exchanger is connected to the lower heat exchanger such that the central heat exchanger lubricant pathway is in fluid communication with the lower heat exchanger lubricant pathway and the central lubricant return tube is in fluid communication with the lower lubricant return tube.

6. The motor of embodiment 1, wherein a power module further comprises a radial bearing sleeve affixed to a rotor and a radial bushing coupled to the power module housing, wherein the radial bushing is configured to provide radial support to the bearing sleeve and rotor.

7. The motor of embodiment 6, wherein the bearing sleeve comprises a material with a higher microhardness than material of the radial bushings.

8. A motor for an electrical submersible pump assembly, the motor comprising:
  a head module;
  a power module;
  a base module; and
  a single-piece housing coupling comprising a first end and a second end, the first end of the single-piece housing coupling comprising threads which turn in a first direction, the second end of the single-piece housing coupling comprising threads which turn in a second direction, wherein the head module is joined to the power module using a single-piece housing coupling.

9. The assembly of embodiment 8, wherein the base module is joined to the power module using a single-piece housing coupling.

10. The assembly of embodiment 8, further comprising a lock nut, and a spacer ring.

11. An electric submersible pump assembly, comprising:
a pump module, wherein the pump module comprises a pump shaft and an impeller;
a gas separator module wherein the gas separator comprises a gas separator shaft and an inducer;
a seal section configured to transmit torque from the motor shaft to the gas separator shaft and absorb thrust from the pump module; and
a motor module, wherein the motor module comprises electric motor configured to rotate a motor shaft;
wherein the pump module is joined to the gas separator module using a flangeless connection, the gas separator is joined to the seal section using a flangeless connection, and the seal section is joined to the motor module using a flangeless connection.

12. The assembly of embodiment 11, further comprising a motor cooling system, wherein the motor cooling system comprises a motor cooling impeller, the motor cooling impeller configured to circulate lubricant through a motor module heat exchanger wherein the motor module each exchange is joined to the motor module using a flangeless connection.

13. An electric submersible pump assembly, comprising:
a pump module, wherein the pump module comprises a pump shaft and an impeller;
a fluid intake wherein the fluid intake comprises an intake shaft;
a seal section configured to transmit torque from the motor shaft to the intake shaft and absorb thrust from the pump module; and
a motor module, wherein the motor module comprises electric motor configured to rotate a motor shaft;
wherein the pump module is joined to the fluid intake using a flangeless connection, the fluid intake is joined to the seal section using a flangeless connection, and the seal section is joined to the motor module using a flangeless connection.

Thrust Chamber Embodiments

1. A thrust chamber arranged to transfer thrust from a shaft to a thrust bearing, the thrust chamber comprising:
a shaft, wherein the shaft is operably connected to at least one impeller wherein the impeller generates downward thrust when in operation;
a thrust chamber outer housing;
a first thrust runner, wherein the first thrust runner is coupled to the shaft and comprises an upward facing thrust transferring surface and a downward facing thrust transfer surface;
a first thrust bearing assembly coupled to the outer housing; wherein the first thrust bearing assembly comprises an upward facing thrust receiving surface and wherein the first thrust runner is configured to transfer downward thrust from the shaft to the first thrust bearing assembly;
an up-thrust bearing assembly coupled to the outer housing, wherein the up-thrust bearing assembly comprises a downward facing thrust receiving surface and wherein the first runner is configured to transfer upward thrust from the shaft to the up-thrust bearing assembly;
a second thrust runner, wherein the second thrust runner is coupled to the shaft and comprises a downward facing thrust transfer surface;
a second thrust bearing assembly coupled to the outer housing, wherein the second thrust bearing assembly comprises an upward facing thrust receiving surface and wherein the second thrust runner is configured to transfer downward thrust from the shaft to the second thrust bearing assembly;
a first and a second damper, wherein the first damper is configured to absorb downward thrust from the first thrust runner and transfer the downward thrust to the first thrust bearing assembly and the second damper is configured to absorb downward thrust from the second thrust runner and transfer the downward thrust to the second thrust bearing assembly; and
a thrust chamber heat exchanger, wherein the thrust chamber heat exchanger comprises a thrust chamber interior housing and thrust chamber lubricant return path, wherein the thrust chamber interior housing is disposed within the thrust chamber outer housing and defines a thrust chamber heat exchanger lubricant pathway therebetween, and wherein the thrust chamber lubricant return path is in fluid communication with the thrust chamber lubricant pathway and is disposed within the interior housing.

2. The thrust chamber of embodiment 1, wherein the shaft comprises an interior and an exterior, and wherein the interior of the shaft is in fluid communication with the lubricant return path.

3. The thrust chamber of embodiment 1, wherein the up-thrust bearing assembly comprises a static downward facing thrust receiving surface 4. The thrust chamber of embodiment 1, wherein the upward facing thrust receiving surfaces of the first and second thrust bearing assemblies have a lower microhardness than the downward facing thrust transfer surfaces of the first and second thrust runners.

5. The thrust chamber of embodiment 1, wherein the dampers are configured to distribute substantially even thrust load across the first and second thrust bearing assemblies.

6. The thrust chamber of embodiment 1, wherein the dampers comprise Belleville washers.

7. The thrust chamber of embodiment 1, wherein the dampers comprise stacks of Belleville washers configured in parallel.

8. The thrust chamber of embodiment 1, wherein the thrust chamber lubricant pathway is substantially helical.

9. The thrust chamber of embodiment 1, wherein the thrust chamber heat exchanger further comprises a filter screen in fluid communication with the thrust chamber lubricant pathway.

10. The thrust chamber of embodiment 1, wherein the thrust chamber heat exchanger further comprises a magnetic trap in fluid communication with the thrust chamber lubricant pathway.

11. The thrust chamber of embodiment 1, wherein the outer thrust housing is threadedly connected to a seal module, and wherein the seal module is disposed between a motor module and a pump module.

12. The thrust chamber of embodiment 11, wherein the pump module comprises an impeller that generates downward thrust when in operation, and wherein the downward thrust generated by the impeller is communicated to the thrust chamber shaft and transferred by the first and second thrust runners to the first and second thrust bearing assemblies which are axially fixed to the thrust chamber outer housing.

13. The thrust chamber of embodiment 11, the seal module further comprising an interior seal housing, an exterior seal housing, and a seal lubricant return path, wherein the interior seal housing is disposed within the exterior seal housing and defines a seal lubricant pathway therebetween, the seal lubricant pathway in fluid communication with the seal lubricant return path and the seal lubricant return path in fluid communication with the thrust chamber; the impeller configured to drive lubricant into the seal lubricant pathway.

High Speed Self Aligning Bearing Embodiments

1. A radial bearing assembly suitable for mounting on a rotatable shaft, comprising:
one or more radial bearings, each bearing comprising a bushing and a sleeve, the bushing and sleeve each comprising an interior and an exterior, the interior of the bushing being in lubricated engagement with the exterior of the sleeve, wherein the bushing is affixable to a non-rotatable bushing support and comprises a material having a higher micro-hardness than the sleeve and wherein the sleeve is configured to mount to a rotating shaft and comprises a material having a higher flexural strength than the bushing.

2. The assembly of embodiment 1, wherein the bushing interior comprises a plurality of grooves configured to allow lubricant to flow between the bushing and the sleeve and wherein the grooves are configured to discharge debris.

3. The assembly of embodiment 1, further comprising an elastomeric band disposed between the bushing exterior and bushing support, the elastomeric band configured to expand when in contact with lubricant and prevent substantial deleterious movement of the bushing relative to the bushing support.

4. The assembly of embodiment 3, further comprising a groove in the bushing exterior wherein the groove is configured to increase binding between the bushing and the elastomeric band.

5. The assembly of embodiment 4, wherein the groove is helical and wherein the elastomeric band is configured to dampen vibration.

6. The assembly of embodiment 1, wherein the sleeve is axially movable between about 1 mm and about 3 mm relative to the rotating shaft.

7. The assembly of embodiment 1, wherein the sleeve comprises two outer sleeves and an inner sleeve body and wherein the two outer sleeves and inner sleeve body each comprise a keyway.

8. The assembly of embodiment 7, wherein the sleeve body and the rotating shaft each comprise an interior and an exterior and wherein the sleeve body comprises an opening allowing lubricant to pass from the interior of the sleeve body to the exterior of the sleeve body and wherein the shaft comprises an opening allowing lubricant to pass from the interior of the shaft to the exterior of the shaft, and wherein one or more elastomeric bands are disposed between the exterior of the shaft and the interior of the sleeve body creating a gap for the flow of lubricant from the interior of the shaft to the exterior of the sleeve body.

9. The assembly of embodiment 8, wherein the assembly further comprises a screen configured to be in fluid communication with a lubricant, the screen designed to filter wear products from the lubricant.

10. The assembly of embodiment 8, wherein the assembly further comprises a magnetic trap configured to be in fluid communication with a lubricant, the magnetic trap designed to remove ferrous wear products from the lubricant.

11. The assembly of embodiment 1, wherein the bushing comprises a bushing body and a bushing insert, wherein the bushing insert comprises a material having a higher micro-hardness than the sleeve and wherein the bushing body comprises a low CTE material.

12. The assembly of embodiment 2, wherein the grooves are configured to discharge debris caused by interaction of the bushing and sleeve.

13. The assembly of embodiment 2, wherein the grooves are at least about 4 mm wide.

14. The assembly of embodiment 3, wherein the substantial deleterious movement comprises axial and rotational movement.

15. The radial bearing assembly of embodiment 1, wherein the bushing has a microhardness of at least 500 MPa greater than the microhardness of the sleeve.

16. The radial bearing assembly of embodiment 1, wherein the sleeve has a flexural strength of at least 500 MPa greater than the bushing.

17. The radial bearing assembly of embodiment 11, wherein the bushing body comprises a material with a coefficient of thermal expansion of less than about 5 µm/m-° C.

18. The radial bearing assembly of embodiment 1, wherein the rotatable shaft is part of an electrical submersible pump.

19. The radial bearing assembly of embodiment 1, wherein the rotatable shaft is part of an electric motor.

20. A radial bearing assembly suitable for mounting on a rotatable shaft, comprising:
one or more radial bearings, each bearing comprising a bushing and a sleeve, the bushing and sleeve each comprising an interior and an exterior, the interior of the bushing being in lubricated engagement with the exterior of the sleeve, wherein the bushing is affixable to a non-rotatable bushing support and comprises a material having a lower micro-hardness than the sleeve and wherein the sleeve is configured to mount to a rotating shaft and comprises a material having a lower flexural strength than the bushing.

Additional Embodiments

1. An electric submersible pump assembly, comprising:
a pump module, wherein the pump module comprises a pump shaft and an impeller, wherein the pump shaft is operably connected to a motor shaft and wherein the impeller is rotationally fixed to the pump shaft by a keyway;
a seal section, wherein the seal section is configured to transmit torque from the motor shaft and absorb thrust from the pump module;
a motor module, wherein the motor module comprises a motor configured to operate at greater than 4,000 rpm, the motor configured to rotate a motor shaft; and
a motor cooling system, wherein the motor cooling system comprises a motor cooling impeller, the motor cooling impeller configured to circulate lubricant through a motor module heat exchanger wherein the motor module heat exchanger comprises a motor module lubricant pathway, the motor module lubricant pathway configured to increase a residence time of the lubricant in the motor module heat exchanger.

2. The assembly of embodiment 1, wherein the seal section comprises a seal section cooling system wherein the seal section cooling system comprises a seal section heat exchanger wherein the seal section heat exchanger comprises a seal section lubricant pathway, the seal section lubricant pathway configured to increase a residence time of the lubricant in the seal section heat exchanger.

3. The assembly of any of the preceding embodiments, further comprising an axial seating system comprising a static thrust receiving face and a dynamic thrust transferring face, wherein the dynamic face has a higher microhardness than the static face and the static face has a higher compressive strength than the dynamic face.

4. The assembly of any of the preceding embodiments, wherein the assembly is configured to produce well bore fluid at a rate of between about 400 barrels per day and about 4,000 barrels per day without changing the electric submersible pump.

5. An actively cooled electric submersible pump assembly comprising:

an electric motor, wherein the motor comprises an impeller, a central heat exchanger, and a lower heat exchanger, the impeller arranged to drive lubricant into the central heat exchanger;

the central heat exchanger comprising a central exterior housing, a central interior housing, and a central lubricant return tube, wherein the central interior housing is disposed within the central exterior housing and defines a central heat exchanger lubricant pathway therebetween, and wherein the central lubricant return tube is disposed within central interior housing;

the lower heat exchanger comprising a lower exterior housing, a lower interior housing, and a lower lubricant return tube, wherein the lower interior housing is disposed within the lower exterior housing and defines a lower heat exchanger lubricant pathway therebetween, and wherein the lower lubricant return tube is disposed within the lower interior housing and is in fluid communication with the lower heat exchanger lubricant pathway;

wherein the central heat exchanger is connected to the lower heat exchanger such that the central heat exchanger lubricant pathway is in fluid communication with the lower heat exchanger lubricant pathway and the central lubricant return tube is in fluid communication with the lower lubricant return tube.

6. The assembly of embodiment 5, further comprising a motor housing, a stator, and a rotor shaft wherein the rotor shaft is disposed within the stator and the stator is disposed within the motor housing;

the rotor shaft comprising an interior and an exterior, the interior of the rotor shaft in fluid communication with the central lubricant return tube and the interior of the motor housing;

the rotor shaft arranged such that lubricant may flow from the central lubricant return tube through the interior of the rotor shaft into the interior of the motor housing and between the motor housing and the stator.

7. The assembly of embodiments 5 or 6, further comprising a first central heat exchanger and a second central heat exchanger, wherein central heat exchanger lubricant pathway of the first central heat exchanger is in fluid communication with the central heat exchanger lubricant pathway of the second central heat exchanger and the central heat exchanger lubricant pathway of the second central heat exchanger is in fluid communication with the lower heat exchanger lubricant pathway of the lower heat exchanger.

8. The assembly of embodiments 5, 6, or 7, further comprising a seal section, the seal section comprising a thrust chamber, an impeller, an interior seal housing, an exterior seal housing, and a seal lubricant return path, wherein the interior seal housing is disposed within the exterior seal housing and defines a seal lubricant pathway therebetween, the seal lubricant pathway in fluid communication with the seal lubricant return path and the seal lubricant return path in fluid communication with the thrust chamber; the impeller configured to drive lubricant into the seal lubricant pathway.

9. The electric submersible pump assembly of embodiments 1 or 5 further comprising a thrust chamber arranged to transfer thrust from a shaft to a thrust bearing, the thrust chamber comprising:

a shaft, wherein the shaft is operably connected to at least one impeller wherein the impeller generates downward thrust when in operation;

a thrust chamber outer housing;

a first thrust runner, wherein the first thrust runner is coupled to the shaft and comprises an upward facing thrust transferring surface and a downward facing thrust transfer surface;

a first thrust bearing assembly coupled to the outer housing; wherein the first thrust bearing assembly comprises an upward facing thrust receiving surface and wherein the first thrust runner is configured to transfer downward thrust from the shaft to the first thrust bearing assembly;

an up-thrust bearing assembly coupled to the outer housing, wherein the up-thrust bearing assembly comprises a downward facing thrust receiving surface and wherein the first runner is configured to transfer upward thrust from the shaft to the up-thrust bearing assembly;

a second thrust runner, wherein the second thrust runner is coupled to the shaft and comprises a downward facing thrust transfer surface;

a second thrust bearing assembly coupled to the outer housing, wherein the second thrust bearing assembly comprises an upward facing thrust receiving surface and wherein the second thrust runner is configured to transfer downward thrust from the shaft to the second thrust bearing assembly;

a first and a second damper, wherein the first damper is configured to absorb downward thrust from the first thrust runner and transfer the downward thrust to the first thrust bearing assembly and the second damper is configured to absorb downward thrust from the second thrust runner and transfer the downward thrust to the second thrust bearing assembly; and a thrust chamber heat exchanger, wherein the thrust chamber heat exchanger comprises a thrust chamber interior housing and thrust chamber lubricant return path, wherein the thrust chamber interior housing is disposed within the thrust chamber outer housing and defines a thrust chamber heat exchanger lubricant pathway therebetween, and wherein the thrust chamber lubricant return path is in fluid communication with the thrust chamber lubricant pathway and is disposed within the interior housing.

10. The assembly of embodiment 9, wherein the outer thrust housing is threadedly connected to a seal section, and wherein the seal section is disposed between a motor module and a pump module.

11. The assembly of embodiments 9 or 10, wherein the pump module comprises an impeller that generates downward thrust when in operation, and wherein the downward thrust generated by the impeller is communicated to the thrust chamber shaft and transferred by the first and second thrust runners to the first and second thrust bearing assemblies which are axially fixed to the thrust chamber outer housing.

12. The assembly of embodiments 10 or 11, the seal section further comprising an interior seal housing, an exterior seal housing, and a seal lubricant return path, wherein the interior seal housing is disposed within the exterior seal housing and defines a seal lubricant pathway therebetween, the seal lubricant pathway in fluid communication with the seal lubricant return path and the seal lubricant return path in fluid communication with the thrust chamber; the impeller configured to drive lubricant into the seal lubricant pathway.

13. The assembly of any of the preceding embodiments, further comprising a single-piece housing coupling comprising a first end and a second end, the first end of the single-piece housing coupling comprising threads which turn in a first direction, the second end of the single-piece housing coupling comprising threads which turn in a second direction.

14. The assembly of any of the preceding embodiments, further comprising a radial bearing assembly suitable for mounting on a rotatable shaft, the radial bearing assembly comprising:
one or more radial bearings, each bearing comprising a bushing and a sleeve, the bushing and sleeve each comprising an interior and an exterior, the interior of the bushing being in lubricated engagement with the exterior of the sleeve, wherein the bushing is affixable to a non-rotatable bushing support and comprises a material having a higher micro-hardness than the sleeve and wherein the sleeve is configured to mount to a rotating shaft and comprises a material having a higher flexural strength than the bushing.

15. The assembly of embodiment 14, wherein the bushing has a microhardness of at least 500 MPa greater than the microhardness of the sleeve.

The invention claimed is:

1. A process for connecting two or more permanent magnet motors each having a rotor and a stator in series for an electrical submersible pump comprising:
making a phase alignment mark on each stator of the two or more motors to be connected;
making a pole identifying mark on each rotor of the two or more motors to be connected;
using the phase alignment marks to align the phases of the stators; and
using the pole identifying marks to align the poles of the rotors,
wherein the phase alignment mark on each stator is formed on exterior surface of each stator.

2. The process of claim 1, wherein the process further comprises starting a winding on each stator at the phase alignment mark.

3. The process of claim 1, wherein each phase alignment mark comprises a mark machined onto each stator.

4. The process of claim 1, wherein each phase alignment mark comprises a mark painted onto each stator.

5. The process of claim 1, wherein each phase alignment mark comprises a mark adhered onto each stator.

6. The process of claim 1, wherein the process further comprises installing each stator in a motor housing and indicating a location of each phase alignment mark on an exterior of each motor housing.

7. The process of claim 1, wherein each pole identifying mark comprises a mark machined onto each rotor.

8. The process of claim 1, wherein each pole identifying mark comprises a mark painted onto each rotor.

9. The process of claim 1, wherein each pole identifying mark comprises a mark adhered onto each rotor.

10. The process of claim 1, wherein each pole identifying mark comprises a notch on an end of a rotor shaft of each rotor wherein the notch is configured to align with a coupling alignment notch.

11. An electric motor for an electric submersible pump comprising:
a first permanent magnet electric motor comprising a first rotor with a first pole identifying mark and a first stator with a first phase alignment mark;
a second permanent magnet electric motor comprising a second rotor with a second pole identifying mark and a second stator with a second phase alignment mark;
wherein the phases of the first and second stators are substantially aligned and wherein the poles of the first and second rotor are substantially aligned,
wherein the phase alignment mark on each stator is formed on exterior surface of each stator.

12. The electric motor of claim 11, wherein the first permanent magnet motor comprises threads on an inner diameter which turn in a first direction and wherein second permanent magnet motor comprises threads on an inner diameter which turn in a second direction,
the electric motor further comprising a single-piece housing coupling comprising a first end and a second end, the first end of the single-piece housing coupling comprising threads on an outer diameter which turn in a first direction, the second end of the single-piece housing coupling comprising threads on an outer diameter which turn in a second direction,
wherein the first permanent magnet motor is joined to the second permanent magnet electric motor using the threads on the single-piece housing coupling, the threads on the first permanent magnet motor, and the threads on the second permanent magnet motor.

13. The electric motor of claim 11, further comprising the first stator installed in a first motor housing and the second stator installed in a second motor housing wherein an exterior of each of the first and second motor housings indicates the location of the first and second phase alignment mark.

14. The electric motor of claim 11, wherein the first and second permanent magnet electric motors are configured to be driven with a variable speed drive of less than 800 volts.

15. The electric motor of claim 11, wherein each of the first and second permanent magnet motors comprises from 2-20 poles.

16. The electric motor of claim 11, wherein each of the first and second pole identifying marks comprises a mark machined onto the first and second rotors.

17. The electric motor of claim 11, wherein each of the first and second pole identifying marks comprises a mark painted onto the first and second rotors.

18. The electric motor of claim 11, wherein each of the first and second pole identifying marks comprises a mark adhered onto the first and second rotors.

19. The electric motor of claim 11, wherein each of the first and second pole identifying marks comprises a notch on an end of a rotor shaft of each of the first and second rotors wherein the notch is configured to align a coupling alignment notch.

20. The electric motor of claim 11, wherein each of the first and second rotors comprises a solid steel bar rotor.

21. An electric submersible pump comprising:
a power module comprising a first permanent magnet electric motor comprising a first rotor with a first pole identifying mark and a first stator with a first phase alignment mark and a second permanent magnet electric motor comprising a second rotor with a second pole identifying mark and a second stator with a second phase alignment mark, wherein the phases of the first and second stators are substantially aligned and wherein the poles of the first and second rotors are substantially aligned;

a head module; and a base module, wherein the phase alignment mark on each stator is formed on exterior surface of each stator.

\* \* \* \* \*